United States Patent
Taniguchi et al.

(10) Patent No.: US 10,677,719 B2
(45) Date of Patent: Jun. 9, 2020

(54) GAS ANALYZING APPARATUS

(71) Applicant: FUJI ELECTRIC CO., LTD., Kanagawa (JP)

(72) Inventors: Yu Taniguchi, Suginami-ku (JP); Kazuhiro Koizumi, Sagamihara (JP); Hojun Yamauchi, Fuchu (JP)

(73) Assignee: FUJI ELECTRIC CO., LTD., Kanagawa, Tokyo ( * ) Notice: Subject to any disclaimer, the term of this patent is extended or adjusted under 35 U.S.C. 154(b) by 0 days.

(21) Appl. No.: 16/168,674

(22) Filed: Oct. 23, 2018

(65) Prior Publication Data

US 2019/0195784 A1  Jun. 27, 2019

(30) Foreign Application Priority Data

Dec. 27, 2017  (JP) ................. 2017-251920

(51) Int. Cl.
*G01N 21/00* (2006.01)
*G01N 21/3504* (2014.01)
(Continued)

(52) U.S. Cl.
CPC ............ *G01N 21/3504* (2013.01); *G01J 3/42* (2013.01); *G01N 21/39* (2013.01); *G02B 6/3578* (2013.01);
(Continued)

(58) Field of Classification Search
CPC .............................. G01J 2003/423; G01J 3/42; G01N 2021/399; G01N 21/3504; G01N 21/359; G01N 21/39; G02B 6/3578
(Continued)

(56) References Cited

U.S. PATENT DOCUMENTS 5,435,309 A * 7/1995 Thomas ............. A61B 5/14532
250/339.12
7,800,764 B2   9/2010 Kluczynski
(Continued)

FOREIGN PATENT DOCUMENTS

EP    2336738 A1   6/2011
JP    2008070314 A  3/2008
JP    2013156113 A  8/2013

OTHER PUBLICATIONS

Preliminary Search Report issued for counterpart French Application 1871288, issued by the French Patent Office dated Mar. 13, 2020.
(Continued)

*Primary Examiner* — Sunghee Y Gray

(57) ABSTRACT

In gas analyzing apparatuses, interference noises should be reduced. A gas analyzing apparatus for analyzing component included in measuring object gas, including: a light emitting unit to irradiate laser light to the measuring object gas; a light receiving unit to receive the laser light having passed through the measuring object gas; an actuating unit to change an optical path length of the laser light by moving at least one optical element that is arranged in a light path where the laser light is passing; and a calculating unit to calculate concentration of the measuring object gas, based on signals detected by the light receiving unit in two states where the optical element is at different positions by n/2 times the wavelength of the laser light (where, n is integer) is provided.

12 Claims, 17 Drawing Sheets

(51) Int. Cl.
*G01J 3/42* (2006.01)
*G01N 21/39* (2006.01)
*G02B 6/35* (2006.01)
*G01N 21/359* (2014.01)

(52) U.S. Cl.
CPC ...... *G01J 2003/423* (2013.01); *G01N 21/359* (2013.01); *G01N 2021/399* (2013.01)

(58) Field of Classification Search
USPC .................................................. 356/432–444
See application file for complete search history.

(56) References Cited

U.S. PATENT DOCUMENTS

| | | | |
|---|---|---|---|
| 2006/0262311 A1* | 11/2006 | Muta ..................... | G01J 3/433 356/437 |
| 2009/0219315 A1* | 9/2009 | Matsumoto .......... | B41J 2/04581 347/10 |
| 2009/0310877 A1* | 12/2009 | Henrichs .................. | G01J 3/45 382/244 |
| 2011/0228371 A1 | 9/2011 | Kluczynski | |
| 2015/0377774 A1* | 12/2015 | Saptari ............... | G01N 21/3504 356/70 |
| 2016/0054177 A1* | 2/2016 | Feitisch ............... | G01J 3/0205 356/326 |
| 2017/0138834 A1* | 5/2017 | Krauss ................ | G01N 1/2273 |
| 2018/0188162 A1* | 7/2018 | Tanaka ............... | G01N 21/3504 |

OTHER PUBLICATIONS

Kluczynski P et al: "Theoretical Description Based on Fourier Analysis of Wavelength-Modulation Spectrometry in Terms of Analytical and Background Signals", Applied Optics, Optical Society of America, Washington, DC, US, vol. 38, No. 27, Sep. 20, 1999, pp. 5803-5815, XP001176660, ISSN:0003-6935, DOI: 10.1364/AO. 38.005803.

* cited by examiner

GAS ANALYZING APPARATUS

The contents of the following Japanese patent application(s) are incorporated herein by reference:
NO. 2017-251920 filed on Dec. 27, 2017.

BACKGROUND

1. Technical Field

The present invention relates to a gas analyzing apparatus.

2. Related Art

Gas analyzing apparatuses to measure gas concentration using laser absorption spectroscopy are known. In the gas analyzing apparatus, a plurality of optical elements are provided in a light path between the light source unit and the light receiving unit that sandwich the measuring atmosphere. The coherence of laser light causes interference light, due to multiple reflection of light between the optical elements. The interference light is superimposed on the measuring light as an interference noise. To reduce occurrence of the interference light, a technology to finely move the condenser lens along the optical axis direction randomly is known (refer to Patent document 1, for example). However, it is difficult to reduce the interference only by finely moving the condenser lens etc. randomly.

Patent Document 1: Japanese Patent Application Publication No. 2008-70314

In gas analyzing apparatuses, it is preferable to reduce interference noises.

SUMMARY

The first aspect of the present invention provides a gas analyzing apparatus. The gas analyzing apparatus may analyze components included in measuring object gas. The gas analyzing apparatus may include a light emitting unit. The light emitting unit may irradiate laser light to the measuring object gas. The gas analyzing apparatus may include a light receiving unit. The light receiving unit may receive laser light that has passed through the measuring object gas. The gas analyzing apparatus may include an actuating unit. The actuating unit may change the optical path length of the laser light, by moving at least one optical element. The optical elements may be arranged in the light path where the laser light is passing. The gas analyzing apparatus may include a calculating unit. The calculating unit may calculate concentration of the measuring object gas, based on the signals detected by the light receiving unit in two states where the optical elements are at different positions by n/2 times the wavelength of the laser light (where, n is integer).

The light emitting unit may have a light emitting element. The light receiving unit may have a light receiving element. The actuating unit may move at least one of the light emitting element and the light receiving element.

The actuating unit may move the optical element with an amplitude of n/2 times the wavelength of the laser light.

The light receiving unit may measure intensity of the laser light, being synchronized with a period where the actuating unit moves the optical element.

The light emitting unit may have a plurality of light emitting elements having different light emitting wavelengths. The actuating unit may move the light receiving element.

The light emitting unit may select any of the light emitting elements to emit light. The actuating unit may move the light receiving element with an amplitude corresponding to the light emitting wavelength of the light emitting element that is emitting light.

The light emitting unit may sequentially select light emitting elements to emit light. The actuating unit may sequentially move the light receiving elements to positions corresponding to the light emitting wavelength of the light emitting element that is emitting light.

The light emitting unit may further have a heat radiation part. The heat radiation part may radiate heat of the light emitting elements. The actuating unit may move the light receiving elements.

The light emitting unit may be a heat radiation part. The heat radiation part may radiate heat of the light emitting elements. The light emitting unit may have a connecting part. The connecting part may thermally connect between the light emitting element and the heat radiation part, without fixing the relative position between the light emitting element and the heat radiation part. The actuating unit may move the light emitting element.

The light receiving unit may have a circuit board. The circuit board may have an amplifier provided. The amplifier may amplify a signal that is output from the light receiving element. The actuating unit may move the light receiving element and the circuit board.

The actuating unit may control a vibration waveform indicating which position the optical element is moved to, with a triangular wave.

The actuating unit may control a vibration waveform indicating which position the optical element is moved to, with a rectangular wave.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
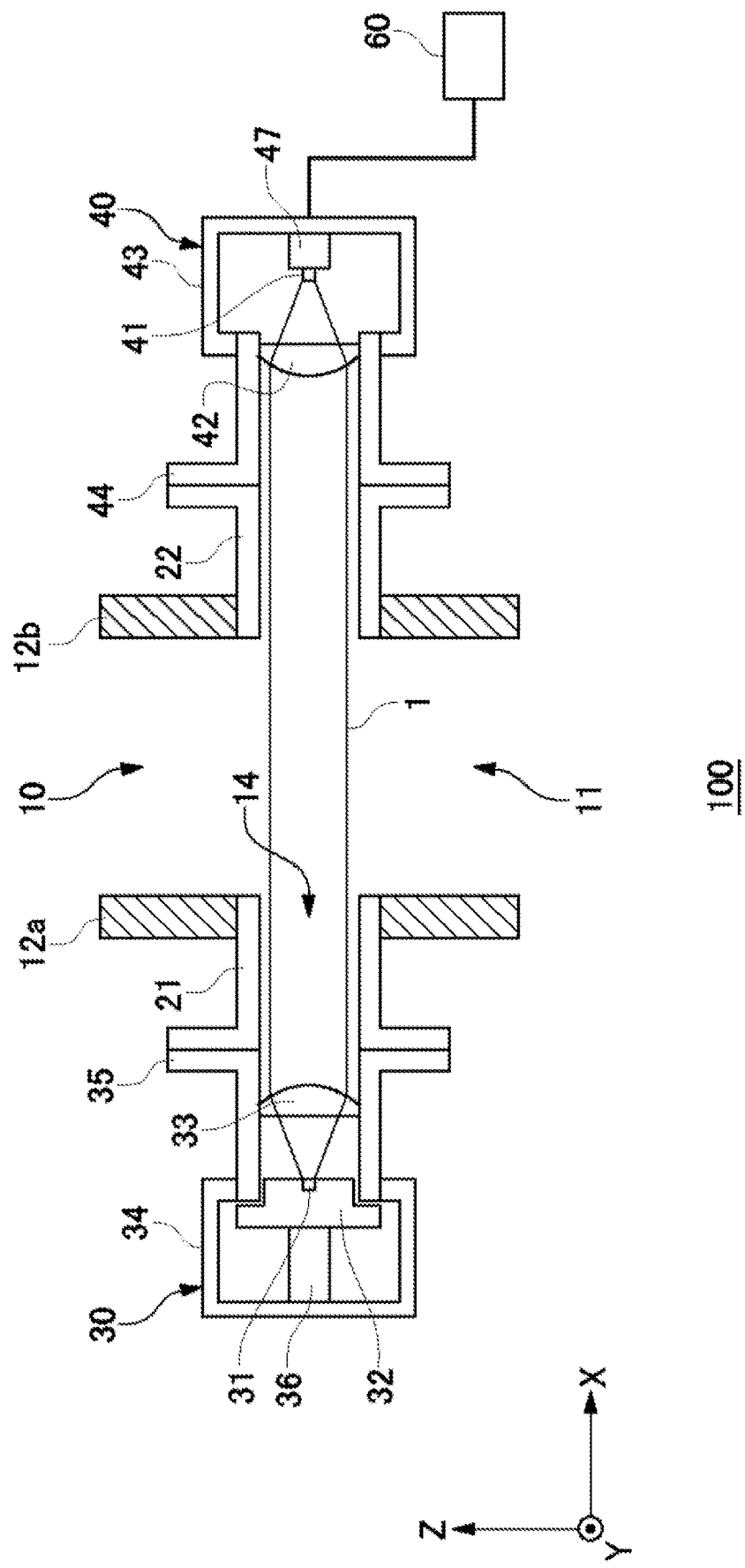
FIG. 1 is a cross sectional view illustrating a schematic configuration of a gas analyzing apparatus 100 in the first embodiment of the present invention.

FIG. 1 is a cross sectional view illustrating a schematic configuration of a gas analyzing apparatus 100 in the first embodiment of the present invention. The gas analyzing apparatus 100 analyzes components included in the measuring object gas. In the present example, the gas analyzing apparatus 100 measures target gas concentration in the measuring object gas included in the gas flowing in the flue 10. The gas analyzing apparatus 100 may be a gas concentration measuring apparatus using laser light irradiation. Measurement methods of the gas analyzing apparatus 100 are not limited. For example, the measurement methods to be employed include Tunable Diode Laser Absorption Spectroscopy (TDLAS method) using light absorption of irradiated laser light 1.

In FIG. 1, the flue 10 forms a flow channel to flow gas. In the present example, the internal space of the flue 10 is a measurement object space 11. The flue 10 may be a flow channel of a gas exhausted from a boiler or a combustion furnace. The boiler and the combustion furnace may burn coal, heavy oil, or refuse. Here, the flue 10 is not limited to a gas flow channel. The flue 10 in the present specification only has to be a device including an internal space where measuring object gas flows, and may be a various types of devices such as a container, chimney, exhaust duct, denitrification apparatus, chemical plant facility, steel plant facility, and furnace.

In the present example, the gas analyzing apparatus 100 includes a light-emitting-side flange unit 21, a light-receiving-side flange unit 22, a light emitting unit 30, and a light receiving unit 40. The light-emitting-side flange unit 21 and the light-receiving-side flange unit 22 are formed in cylindrical shapes with their both ends opened. In the present specification, an optical axis direction of the laser light 1 emitted from the light emitting unit 30 is regarded as X-axis direction. The longitudinal direction of the flue 10 is regarded as Z-axis direction. A direction orthogonal to X-axis direction and Z-axis direction is regarded as Y-axis direction.

The light-emitting-side flange unit 21 is fixed to a wall part 12 so as to go through an opening 14 provided on the wall part 12 of the flue 10. On the other hand, the light-receiving-side flange unit 22 is fixed to the wall part 12 so as to go through the opening provided on the wall part 12 at a position opposed to the light-emitting-side flange unit 21, having the flue 10 therebetween. The light-emitting-side flange unit 21 and the light-receiving-side flange unit 22 are fixed, for example, to the wall part 12 of the flue by welding etc. The light-emitting-side flange unit 21 and the light-receiving-side flange unit 22 may be formed of metal materials such as stainless.

The light emitting unit 30 irradiates laser light 1 to the measuring object gas. In the present example, the light emitting unit 30 irradiates laser light 1, through the opening 14 of the wall part 12 of the flue 10, toward the measurement object space 11. The light emitting unit 30 may include a laser light source unit 32 including a laser light emitting element 31. The light emitting unit 30 includes a housing 34. In one example, the housing 34 may be formed in a bottomed cylindrical shape with one end opened while the other end closed. The housing 34 may be attached to the light-emitting-side flange unit 21 via an emitting tube 35.

The housing 34 houses a laser light source unit 32. The light emitting unit 30 has a collimator lens 33 provided on the emitting side. The collimator lens 33 turns light emitted from the laser light emitting element 31 into collimated light. The laser light 1 that is collimated by the collimator lens 33 may be irradiated to the measurement object space 11. In the present example, the collimator lens 33 is attached inside of the emitting tube 35.

The light receiving unit 40 receives laser light 1 having passed through the measuring object gas. In the present example, it receives laser light 1 having passed through the flue 10. The light receiving unit 40 may have a light receiving element 41. The light receiving unit 40 includes a housing 43. In the one example, the housing 43 may be formed in a bottomed cylindrical shape with one end opened while the other end closed. The housing 43 may be attached to the light-receiving-side flange unit 22 via an entering tube 44. The housing 43 houses the light receiving element 41. On the entering side of the light receiving element 41, a condenser lens 42 may be provided. The condenser lens 42 may be provided so as to cover an opening of the housing 43. The condenser lens 42 condenses the laser light 1 at a position of the light receiving element 41.

The gas analyzing apparatus 100 includes a light receiving signal processing unit 60. The light receiving signal processing unit 60 is an exemplary calculating unit to calculate concentration of the measuring object gas based on a signal that is detected by the light receiving unit 40. The light receiving signal processing unit 60 is electrically connected to the light receiving element 41. FIG. 1 shows the light receiving signal processing unit 60 outside of the housing 43 of the light receiving unit 40, but not limited to this. In the housing 43, at least a part of the light receiving signal processing unit 60 may be provided.

The gas analyzing apparatus 100 includes an actuating unit 36 for the light emitting unit. The actuating unit 36 moves the laser light emitting element 31 along the optical axis direction (X-axis direction). In the present example, the actuating unit 36 moves, along the optical axis direction, the laser light source unit 32 including the laser light emitting element 31. In the present example, the gas analyzing apparatus 100 includes an actuating unit 47 for the light receiving unit. The actuating unit 47 moves the light receiving element 41 along the optical axis direction (X-axis direction). The actuating unit 36 and the actuating unit 47 are examples of an actuating unit to change the optical path length of the laser light 1 by moving at least one optical element that is arranged in the light path where the laser light 1 is passing.

Optical elements to be moved by the actuating unit may include a laser light emitting element 31, a light receiving element 41, a collimator lens 33, and a condenser lens 42. Depending on the optical system of the gas analyzing apparatus 100, a light-emitting-side window part may be provided on the emitting-surface side of the collimator lens 33, and a light-receiving-side window part may be provided on the entering-surface side of the condenser lens 42. In this case, the light-emitting-side window part and the light-receiving-side window part may be included in the optical elements.

In the present example, as the actuating unit, two actuating units: the actuating unit 36 and the actuating unit 47, are included. However, the actuating unit may move at least one of the laser light emitting element 31 and the light receiving element 41. That is, either one of the actuating unit 36 and the actuating unit 47 may be omitted. Also, three or more actuating units may be provided to move three or more optical elements.

The actuating unit moves the optical element with an amplitude of n/2 times the wavelength λ of the laser light 1. Specifically, the actuating unit 36 for the light emitting unit moves the laser light emitting element 31 with an amplitude of n/2 times the wavelength λ of the laser light 1. The actuating unit 47 for the light receiving unit moves the light receiving element 41 with an amplitude of n/2 times the wavelength λ of the laser light 1. The actuating unit 36 may cause two states where the laser light emitting element 31 is at different positions by n/2 times the wavelength of the laser light 1 (where, n is integer). Similarly, the actuating unit 47 may cause two states where the light receiving element 41 is at different positions by n/2 times the wavelength of the laser light 1 (where, n is integer). The light receiving signal processing unit 60 calculates concentration of the measuring object gas, based on the signals detected by the light receiving unit 40 in the two states where the optical elements such as the laser light emitting element 31 are at different positions by n/2 times the wavelength of the laser light 1 (where, n is integer).

Figure 2:
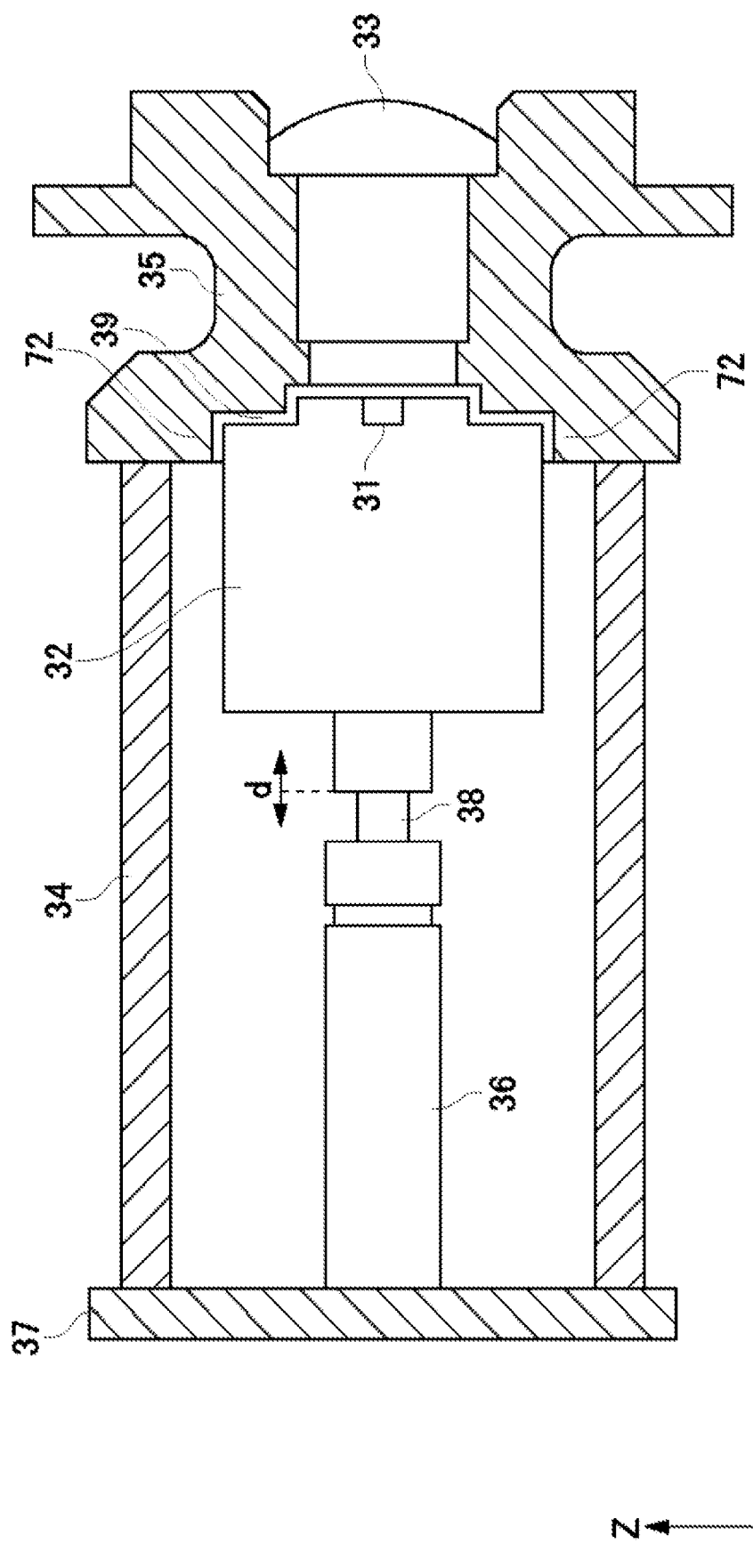
FIG. 2 is a cross sectional view illustrating an exemplary light emitting unit 30.

FIG. 2 is a cross sectional view illustrating an exemplary light emitting unit 30. The light emitting unit 30 includes, in the housing 34, the laser light source unit 32 and the actuating unit 36. In the present example, the emitting tube 35 is provided at one end of the housing 34. The collimator lens 33 is attached to the emitting tube 35. In the present example, the actuating unit 36 may not move the collimator lens 33. Accordingly, the collimator lens can be fixed and thus the gas in the flue 10 can be sealed not to flow into the housing 34.

The actuating unit 36 may include a piezo vibration unit 38 using a piezo element. The piezo vibration unit 38 is an exemplary actuator. The actuating unit 36 may have a control circuit therein to control the piezo vibration unit 38. The piezo vibration unit 38 is deformed by voltage applied on the piezo vibration unit 38 by the control circuit, which allows the laser light emitting element 31 etc. that is connected to the piezo vibration unit 38 to be moved along the optical axis direction (X-axis direction). However, the actuator in the actuating unit 36 is not limited to the piezo vibration unit 38.

The base end of the actuating unit 36 may be fixed to the base plate 37 of the housing 34. The piezo vibration unit 38 may be provided at the end of the actuating unit 36. The piezo vibration unit 38 is connected to the laser light source unit 32. The laser light source unit 32 includes the laser light emitting element 31. The laser light emitting element 31 generates heat, and thus radiating the heat is required. Accordingly, the light emitting unit 30 may include a heat radiation part 72 to radiate heat that is generated from the laser light emitting element 31. In the present example, the emitting tube 35 also functions as the heat radiation part 72, and the heat is radiated from the heat radiation part 72 to the housing 34. However, not limited to this, the housing 34 itself may be the heat radiation part 72, or an individual heat radiation fin etc. may be provided.

In the present example, the relative position of the heat radiation part 72 and the laser light emitting element 31 is not fixed. A connecting part 39 may be included between the heat radiation part 72 and the laser light source unit 32, that is, between the heat radiation part 72 and the laser light emitting element 31. The connecting part 39 thermally connects the laser light emitting element 31 and the heat radiation part 72. The connecting part 39 is heat radiation grease, for example. Providing the heat radiation fin in the laser light source unit 32, the actuating unit 36 may move the laser light source unit 32 and the heat radiation fin. In this case, between both the laser light source unit 32 and the heat radiation fin and the emitting tube 35 or the housing 34, the connecting part 39 such as the heat radiation grease may be provided. By providing the connecting part 39, the actuating unit 36 can move the laser light emitting element 31, ensuring radiating the heat from the laser light emitting element 31.

Here, different from the present example, in the light emitting unit 30, the laser light source unit 32 may be fixed to the heat radiation part 72, considering heat radiation. In this case, the actuating unit 36 for the light emitting unit is omitted. The actuating unit 47 for the light receiving unit may move the light receiving element 41.

Figure 3:
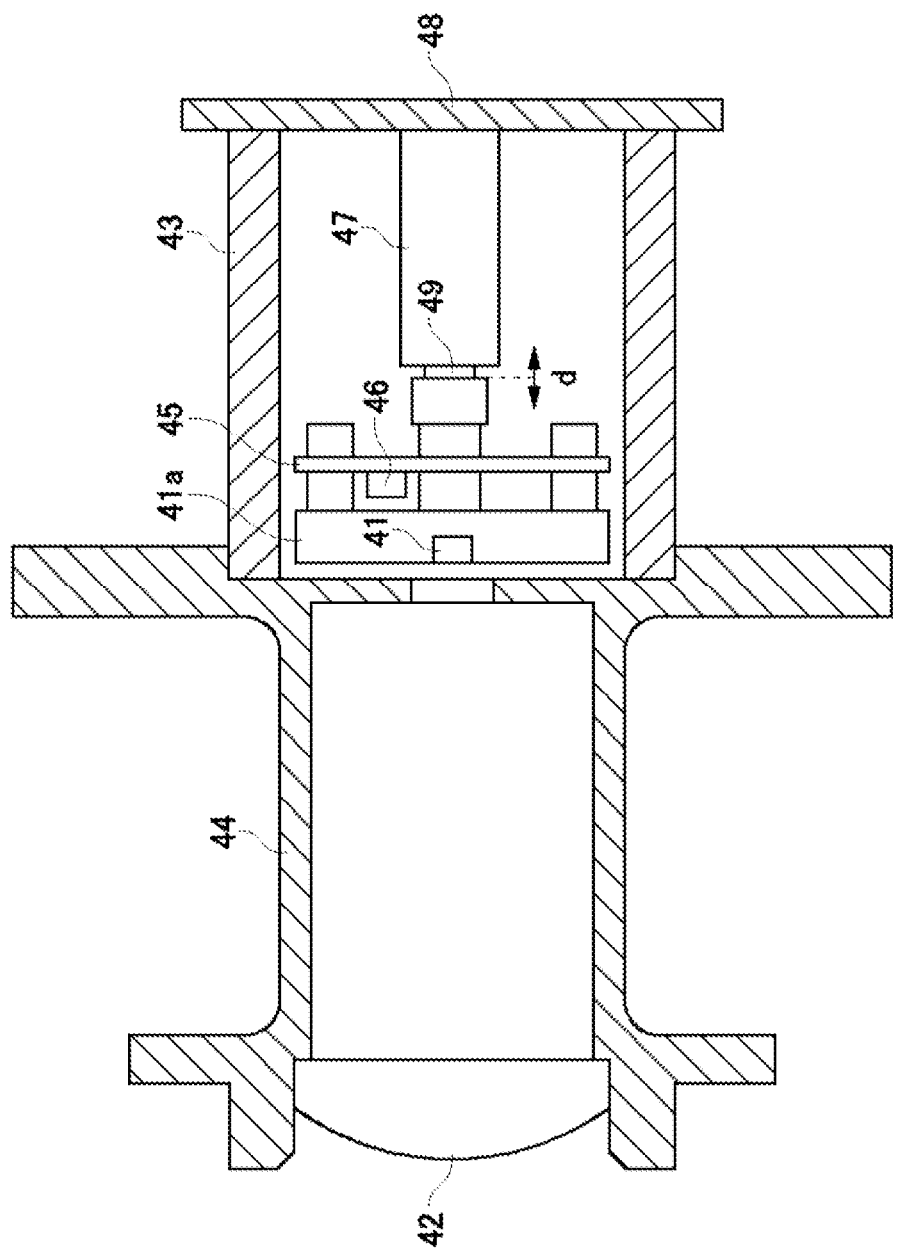
FIG. 3 is a cross sectional view illustrating an exemplary light receiving unit 40.

FIG. 3 is a cross sectional view illustrating an exemplary light receiving unit 40. The light receiving unit 40 includes, in the housing 43, a light receiving element 41, a circuit board 45, and an actuating unit 47. The light receiving element 41 may be held by a light receiving element adaptor 41a. The circuit board 45 may be connected to the light receiving element adaptor 41a. The circuit board 45 may have an amplifier 46 provided. The amplifier 46 amplifies a signal that is output from the light receiving element 41. On one end of the housing 34, the entering tube 44 may be provided. The entering tube 44 may have the condenser lens 42 provided. In the present example, the actuating unit 47 does not move the condenser lens 42. Accordingly, the condenser lens 42 can be fixed, and thus the gas in the flue can be sealed not to flow into the housing 43.

The actuating unit 47 may include a piezo vibration unit 49 using the piezo element. The actuating unit 47 may have a control circuit therein to control the piezo vibration unit 49. The piezo vibration unit 49 is deformed by voltage applied on the piezo vibration unit 49 by the control circuit, which allows the light receiving element 41 etc. that are connected to the piezo vibration unit 49 to be moved along the optical axis direction (X-axis direction). Here, for the actuating unit 47, actuators except piezo elements may be used.

The base end of the actuating unit 47 may be fixed to a base plate 48 of the housing 43. The piezo vibration unit 49 may be provided at the end of the actuating unit 47. The actuating unit 47 may move both the light receiving element 41 and the circuit board 45. Specifically, the piezo vibration unit 49 may move the light receiving element adaptor 41a and the circuit board 45. For example, the piezo vibration unit 49 is connected to the circuit board 45.

As described above, the gas analyzing apparatus 100 of the present embodiment has an actuating unit to change the optical path length of the laser light 1 by moving at least one optical element that is arranged in the light path where the laser light 1 is passing. Then, concentration of the measuring object gas is calculated, based on the signals detected by the light receiving unit 40 in two states where the optical elements are at different positions by n/2 times the wavelength of the laser light 1 (where, n is integer). An interference noise in a state where the optical element is at the position of $+\lambda \cdot n/4$ (where, $\lambda$ is the wavelength of the laser light 1, and n is integer) has an opposite phase to the interference noise in a state where the optical element is at the position of $-\lambda \cdot n/4$. Accordingly, the interference noise can be reduced by averaging the signals that are detected by the light receiving unit 40 in such two states. Thus, the interference can be reduced, compared to a case of random fine movement.

Particularly, in the present embodiment, not the condenser lens, but at least one of the laser light emitting element 31 and the light receiving element 41 is moved as the optical element. Accordingly, compared to a case of moving the condenser lens such as a quarts lens that is heavier than the laser light emitting element 31 etc., load on the actuating unit 36 and the actuating unit 47 can be reduced. Thus, the size of the actuating unit 36 and the actuating unit 47 can be made smaller.

Figure 4:
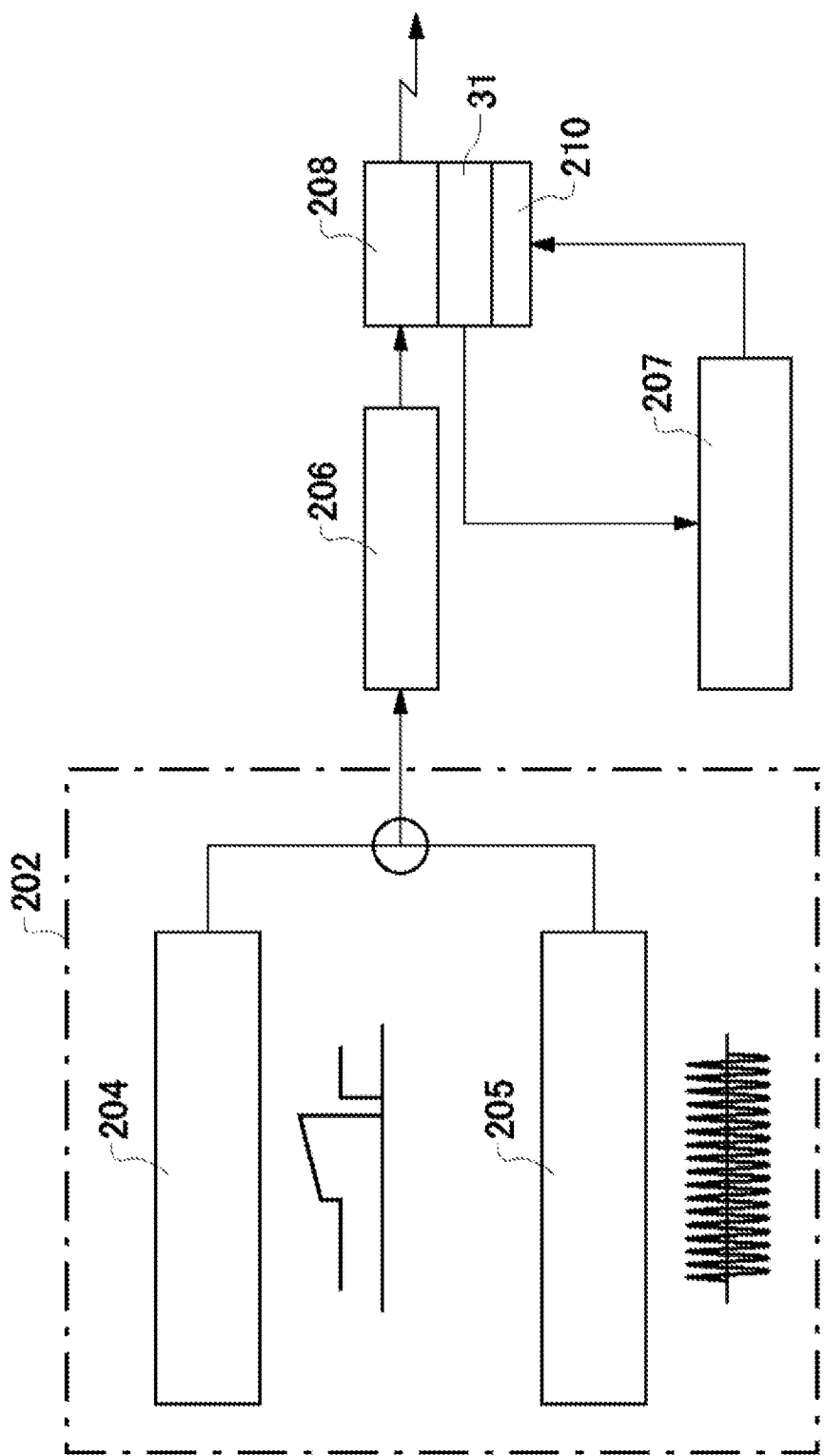
FIG. 4 is a diagram illustrating an exemplary laser light source unit 32.

FIG. 4 is a diagram illustrating an exemplary laser light source unit 32. The laser light source unit 32 may be configured as a unit that houses, in a package, a plurality of components such as the laser light emitting element 31 described below. As shown in FIG. 4, the laser light source unit 32 houses a wavelength scan driving signal generating unit 204 and a harmonic modulation signal generating unit 205 as a wavelength control unit 202, a current control unit 206, the laser light emitting element 31, a thermistor 208, a Peltier device 210, and a temperature control unit 207.

The wavelength scan driving signal generating unit 204 generates a wavelength scan signal in which the light emitting wavelength of the laser light emitting element 31 is variable so as to scan an absorption wavelength of the measuring object gas. The harmonic modulation signal generating unit 205 generates a sine wave signal of about 10 kHz, for example, to detect the gas absorption waveform. The generated sine wave signal is used as the modulated signal. The current control unit 206 converts a laser driving signal into a driving current of the laser light emitting element 31 to drive the laser light emitting element 31. The laser driving signal is a signal obtained by synthesizing the wavelength scan signal that is generated at the wavelength scan driving signal generating unit 204 and the sine wave signal that is generated at the harmonic modulation signal generating unit 205.

The laser light emitting element 31 may be a semiconductor laser diode (LD: Laser Diode). The laser light emitting element 31 emits laser light 1 according to the driving current supplied from the current control unit 206. The thermistor 208 is a temperature detecting element to detect the temperature of the laser light emitting element 31. The Peltier device 210 is a cooling unit to cool down the laser light emitting element 31. The laser light emitting element 31 may be arranged in contact with the thermistor 208. The temperature control unit 207 controls the Peltier device 210 based on the temperature measured by the thermistor 208. Thereby, maintaining the temperature of the laser light emitting element 31 at a constant level enables to control the wavelength of the laser light 1.

Figure 5:
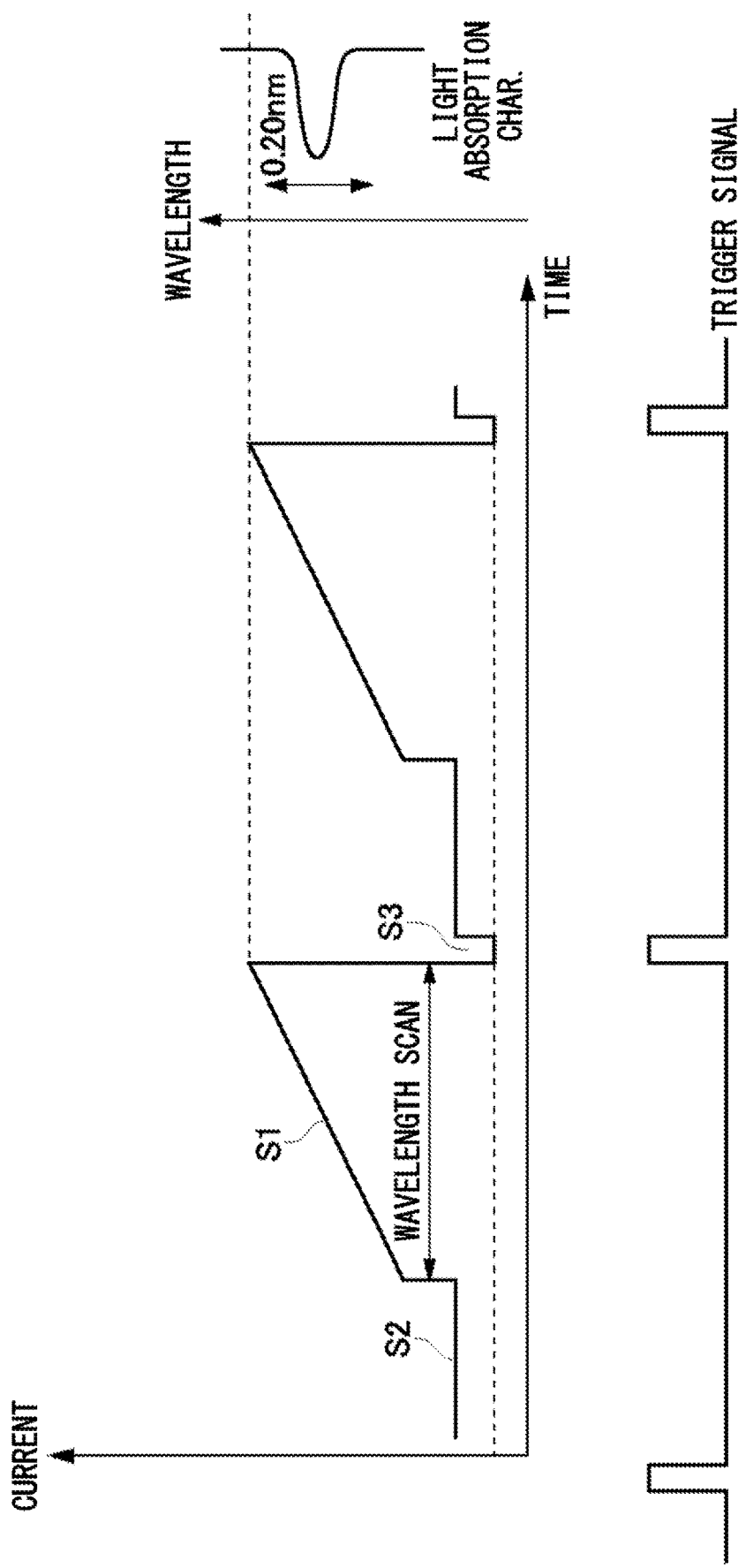
FIG. 5 is a diagram illustrating an exemplary waveform diagram of a scan driving signal.

FIG. 5 is a diagram illustrating an exemplary waveform diagram of the scan driving signal. FIG. 5 shows an exemplary current waveform output from the wavelength scan driving signal generating unit 204 in FIG. 4. The wavelength scan driving signal S1 to scan the light absorption characteristic of the measuring object gas linearly changes the driving current value of the laser light emitting element 31. Thereby, the light emitting wavelength from the laser light emitting element 31 gradually changes. For example, the light emitting wavelength changes so as to scan a light absorption characteristic of about 0.2 nm. On the other hand, the signal S2 makes the laser light emitting element 31 emit light at a constant wavelength, maintaining the driving current value higher than or equal to threshold current where the laser light emitting element 31 is stable. Furthermore, at the signal S3, the driving current value is set to 0 mA. Note that the trigger signal is a signal synchronizing the signal S3.

Figure 6:
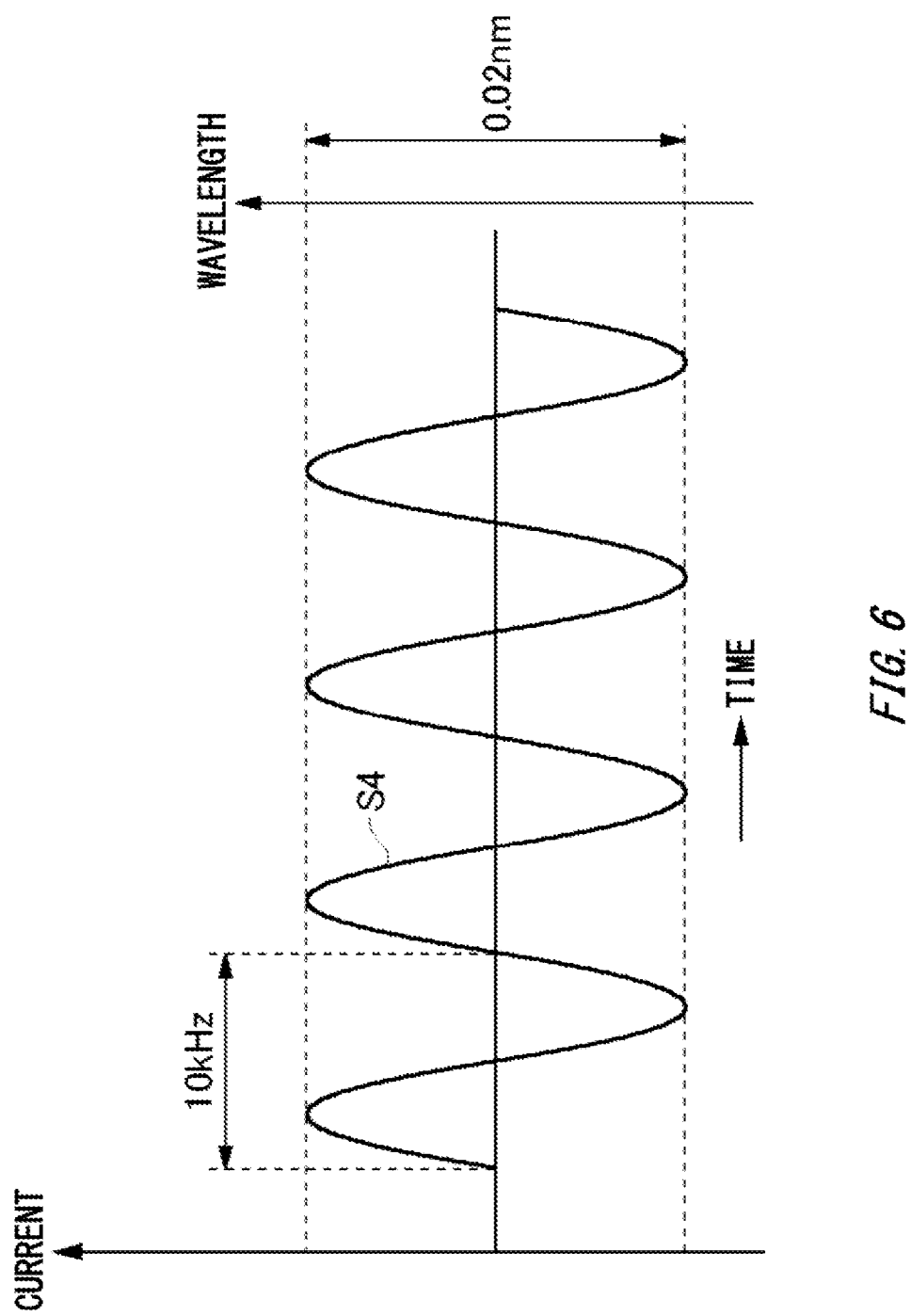
FIG. 6 is an exemplary waveform diagram of a modulated signal that is output from a harmonic modulation signal generating unit.

FIG. 6 is an exemplary waveform diagram of a modulated signal that is output from a harmonic modulation signal generating unit 205. FIG. 6 is a waveform diagram of the modulated signal output from the harmonic modulation signal generating unit 205 in FIG. 4. A signal S4 to detect the light absorption characteristic of the measuring object gas is, for example, regarded as a sine wave having frequency of 10 kHz, and modulates the wavelength within a range of modulation of about 0.02 nm.

Figure 7:
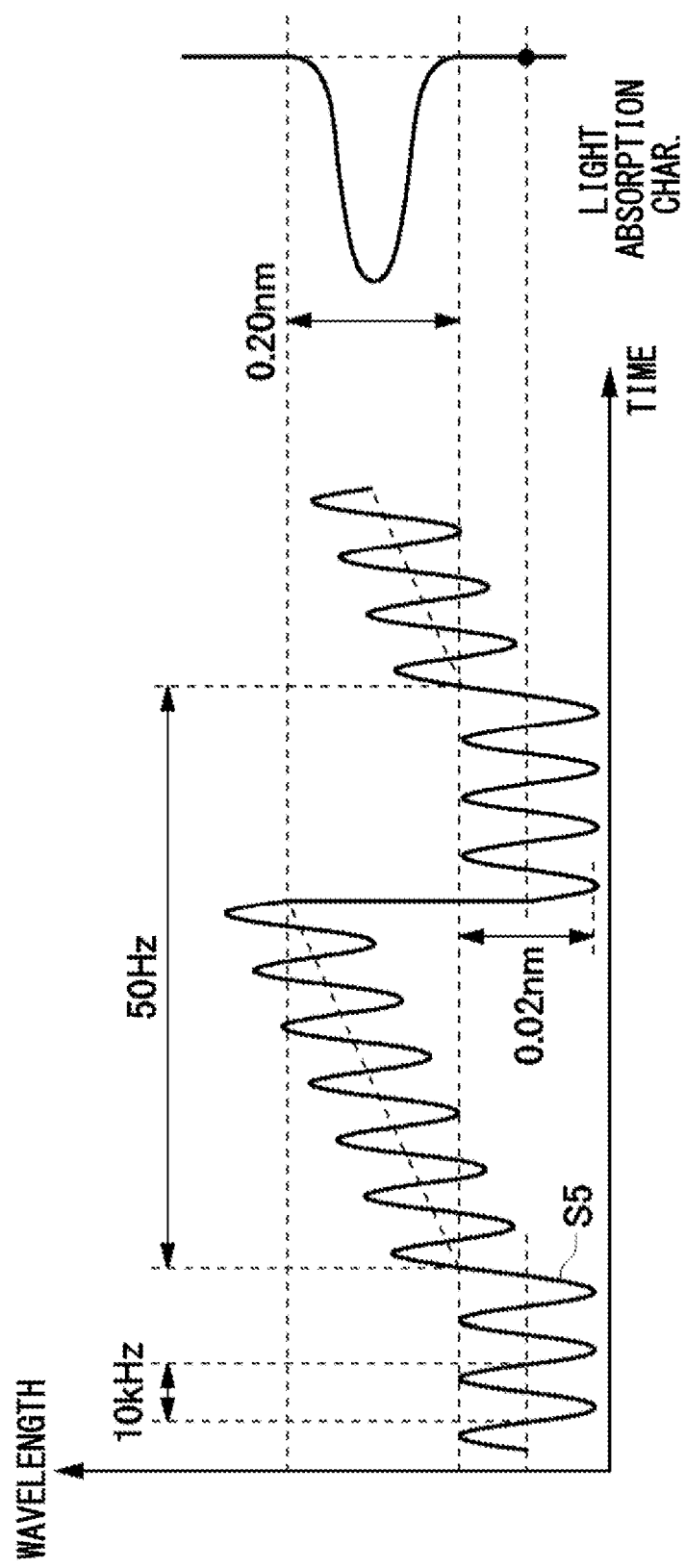
FIG. 7 is an exemplary waveform diagram of a laser driving signal that is output from a current control unit.

FIG. 7 is an exemplary waveform diagram of a laser driving signal that is output from a current control unit. FIG. 7 shows a laser driving signal output from the current control unit 206 in FIG. 4. The driving signal S5 is supplied to the laser light emitting element 31. Thereby, the laser light emitting element 31 outputs modulated light that can, while modulating the wavelength within the modulation range of about 0.02 nm, detect the light absorption characteristic of the measuring object gas in a wavelength range of about 0.2 nm.

Figure 8:
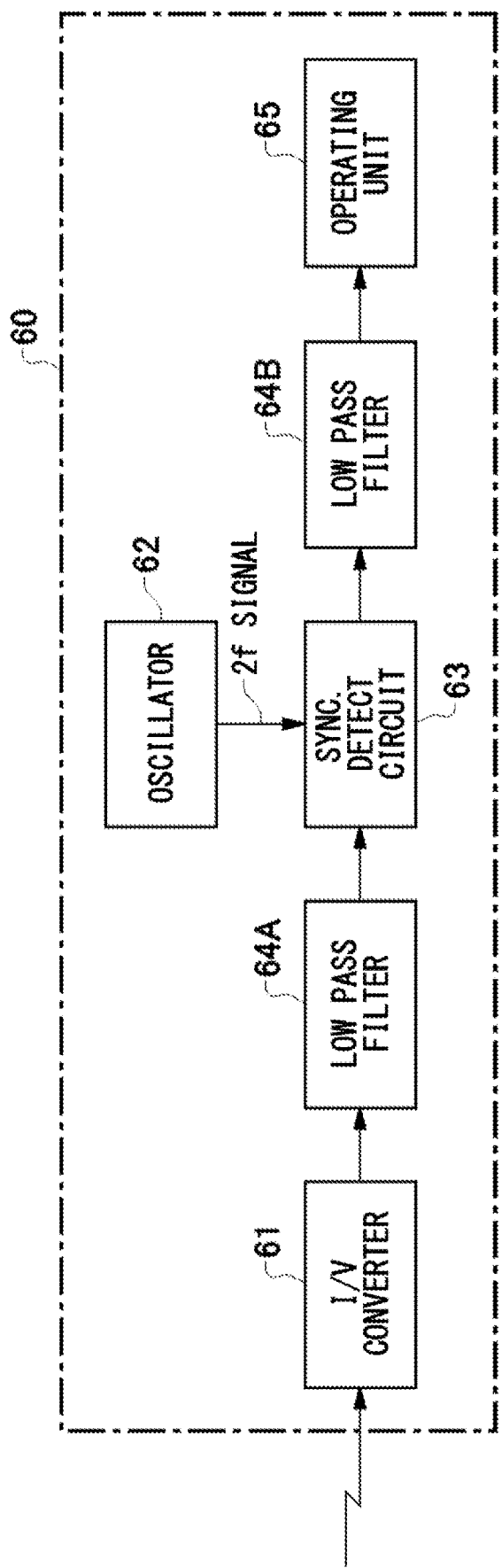
FIG. 8 is a diagram illustrating a schematic configuration of a light receiving signal processing unit 60.

FIG. 8 is a diagram illustrating an schematic configuration of a light receiving signal processing unit 60. The light receiving element 41 shown in FIG. 1 is a photo diode, for example. For the light receiving element 41, an element having sensitivity to the light emitting wavelength of the laser light emitting element 31 is applied. The output of the light receiving element 41 is transmitted to the light receiving signal processing unit 60 through wirings.

The light receiving signal processing unit 60 includes an I-V converter 61, an oscillator 62, a synchronization detecting circuit 63, a low pass filter 64A, a low pass filter 64B, and an operating unit 65. The I-V converter 61 converts the output of the light receiving element 41 into a voltage output. The low pass filter 64A removes higher harmonic noise components from the voltage output. The output signal of the low pass filter 64A is input to the synchronization detecting circuit 63. The synchronization detecting circuit 63 adds, to the output signal of the low pass filter 64A, a 2f signal (double-wave signal) from the oscillator 62 and extracts only an amplitude of the double-frequency component of the modulated signal of the laser light 1. Noise removal and amplification are performed on the output signal of the synchronization detecting circuit 63 in the low pass filter 64B, and the resultant signal is transmitted to the operating unit 65. In the operating unit 65, operation processing to detect the gas concentration is performed.

A method to detect the gas concentration using the gas analyzing apparatus 100 configured as described above is described. First, detecting the temperature of the laser light emitting element 31 by the thermistor 208 in advance. Furthermore, to measure the concentration of the measuring object gas at a center part of the wavelength scan driving signal S1 shown in FIG. 5, controlling energization to the Peltier device 210 by the temperature control unit 207 and maintaining the temperature of the laser light emitting element 31 at a desired temperature level.

While the Peltier device 210 maintaining the temperature of the laser light emitting element 31 at the desired temperature level, the current control unit 206 drives the laser light emitting element 31 by changing the driving current. As a result, the laser light 1 for measuring is irradiated toward in the flue 10 with the measuring object gas therein. The laser light 1 having passed through the measuring object gas enters into the light receiving element 41. If the laser light 1 is absorbed by the measuring object gas, a double-wave signal is detected by the synchronization detecting circuit 63 and a gas absorption waveform appears.

Figure 9:
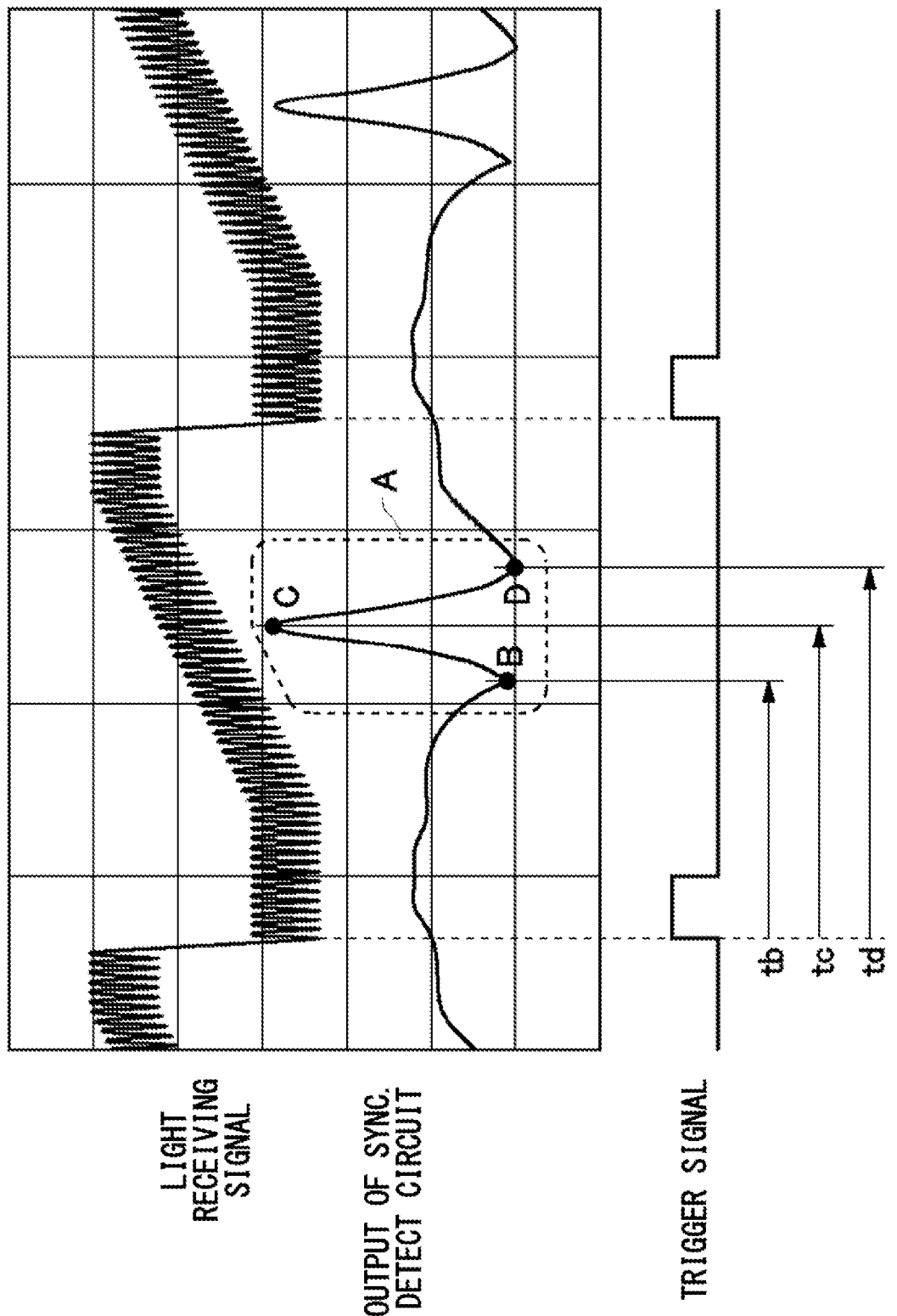
FIG. 9 is a diagram illustrating examples of a light receiving signal, an output signal of a synchronization detecting circuit, and a trigger signal.

FIG. 9 is a diagram illustrating examples of a light receiving signal, an output signal of the synchronization detecting circuit, and a trigger signal. FIG. 9 shows an output waveform of the synchronization detecting circuit 63 when detecting the measuring object gas. Next, to the operating unit 65, a trigger signal from the wavelength scan driving signal generating unit 204 is input. The trigger signal is a signal that is output every period, which is consists of the signals S1, S2, and S3 described above. The trigger signal is output from the wavelength scan driving signal generating unit 204 of the laser light source unit 32. The trigger signal is input to the operating unit 65 of the light receiving signal processing unit 60 via a connecting line. The trigger signal synchronizes the wavelength scan driving signal S3 described above.

In FIG. 9, the area A surrounded by the dotted line is an output waveform that is obtained when the measuring object gas exists. As shown in FIG. 9, the minimum value B, the maximum value C, the minimum value D are detected in the output waveform of the synchronization detecting circuit 63, when predetermined time periods tb, tc, td have elapsed from the start of the trigger signal application. These predetermined time periods tb, tc, td may be experimentally calculated in advance before shipping from a factory or upon calibration to be registered in the memory.

When the predetermined time periods tb, tc, td have elapsed from the start timing of the trigger signal application, the operating unit 65 reads out the output waveform of the synchronization detecting circuit 63 and store the resultant. Then, the operating unit 65 calculates concentration from the stored output waveform. The maximum value C of the peak of the output waveform of the synchronization detecting circuit corresponds to the gas concentration as it is. Accordingly, the operating unit 65 may output a value associated with the maximum value C as the component concentration of the measuring object gas. Alternatively, the operating unit 65 may output, as the concentration, a value associated with at least one of a value obtained by subtracting the minimum value B from the maximum value C, and a value obtained by subtracting the minimum value D from the maximum value C. In this manner, according to the trigger signal, the operating unit 65 measures the concentration of the measuring object gas every single offset.

The method described above enables to detect the gas concentration. Since the laser light emitting element 31 is used for a light source, due to its higher coherency than a normal light source, a part of the laser light 1 multiply reflects, for example, between the laser light emitting element 31 and the entering surface of the collimator lens 33, or between the condenser lens 42 and the light receiving element 41, etc., and this multiple reflection light can be an interference noise.

To reduce this interference noise, in the present embodiment, as described in FIGS. 1 to 3, making the actuating unit 36 and the actuating unit 47 move at least one of the laser light emitting element 31 and the light receiving element 41 with an amplitude of n/2 times the wavelength of the laser light 1. Thereby, as compared with a case of finely moving the condenser lens randomly, the interference can be reduced.

Figure 10:
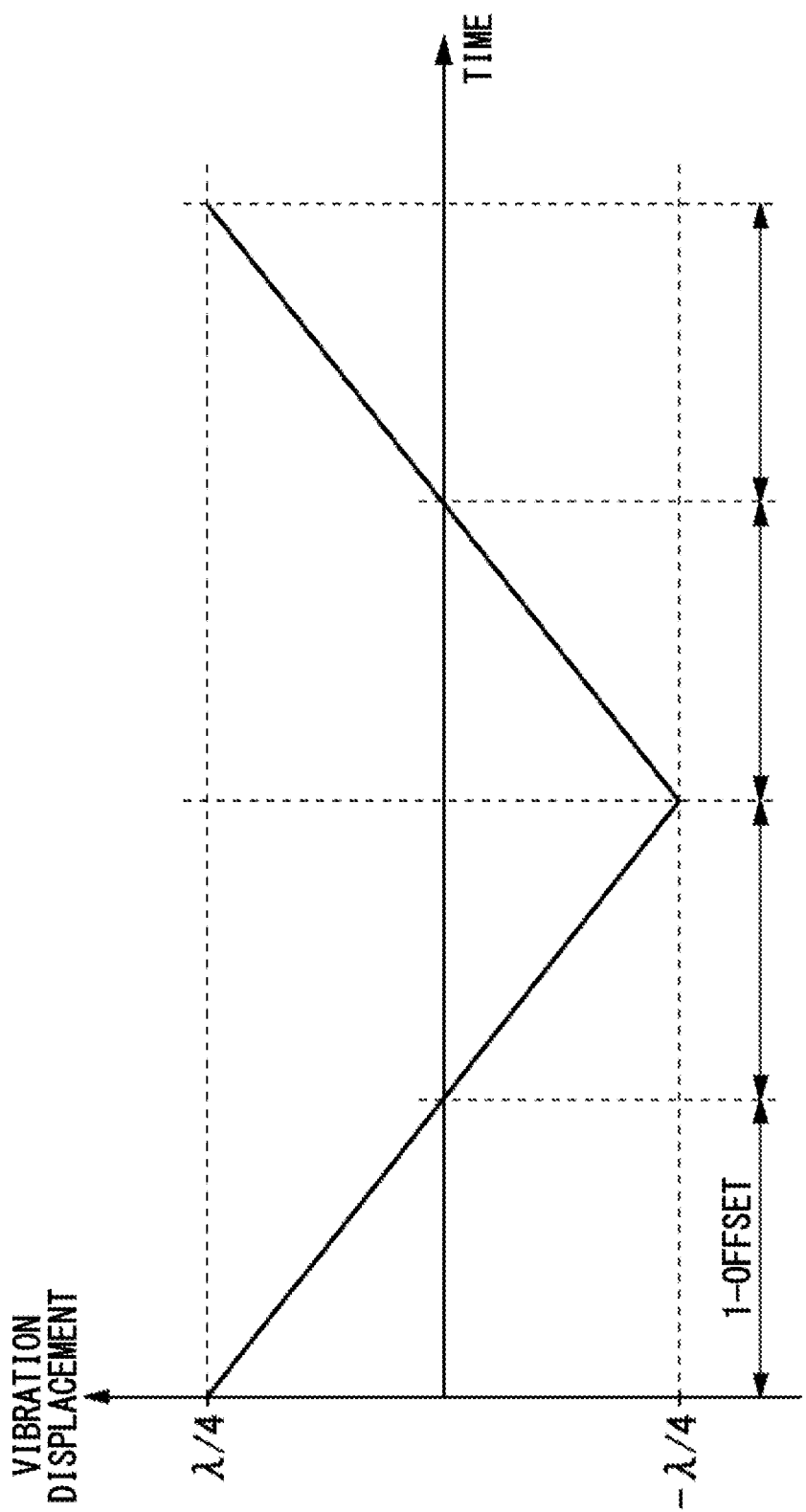
FIG. 10 shows an exemplary vibration waveform by an actuating unit.

FIG. 10 shows an exemplary vibration waveform by an actuating unit. In FIG. 10, the horizontal axis represents time, and the vertical axis represents the vibration displacement. As shown in FIG. 10, the actuating unit may control the vibration waveform indicating which position the optical element is moved to, with a triangular wave. Specifically, the actuating unit 36 vibrates the laser light emitting element 31 with an amplitude of n/2 times the wavelength X of the laser light 1 in the optical axis direction (X-axis direction). The actuating unit 36 moves the laser light emitting element 31 to the positions of ±λ/4. If the wavelength is within 1.6 to 2 μm, the laser light emitting element 31 is moved to the position of within ±0.4 to ±0.5 μm approximately. Similarly, the actuating unit 47 vibrates the light receiving element 41 with an amplitude of n/2 times the wavelength λ of the laser light 1 in the optical axis direction (X-axis direction). In the present example, n=1.

A period of vibration of the piezo vibration unit 38 may synchronize the period of the wavelength scan driving signal S1 shown in FIG. 5. The period of vibration of the piezo vibration unit 38 may be n times the period of the wavelength scan driving signal S1 (where, n is integer). In other words, suppose that the frequency of the vibration of the piezo vibration unit 38 is f, and the frequency of the wavelength scan driving signal is $f_{s1}$, they may satisfy the relationship: $f=f_{s1}/n$ (where, n is integer). As shown in FIG. 9, the wavelength scan driving signal S1 synchronizes measurement timing by the light receiving unit 40 (output of the synchronization detecting circuit). Accordingly, the light receiving unit 40 may measure intensity of the laser light 1, synchronizing a period where the actuating unit 36 moves the optical element. Particularly, the period to acquire the output of the synchronization detecting circuit based on the signal detected by the light receiving unit 40 may synchronizes the period of the optical element being moved by the actuating unit 36. For example, the actuating unit 36 and the output of the synchronization detecting circuit operate according to a clock signal in common.

If the distance between the laser light source unit 32 and the collimator lens 33 is changed by the actuating unit 36, the intensity of the interference light that is caused by the multiple reflection light between the laser light source unit 32 and the surface of the collimator lens 33 varies, because a condition under which the interference is generated changes. The frequency of this interference light variation is equal to the vibration frequency of the piezo vibration unit 38 in the actuating unit 36. Here, the interference noise may be removed from the detected signal by filtering processing such as a low pass filter that can remove the vibration frequency component.

Also, an interference noise in a state where the laser light emitting element 31 is at the position of +λ·n/4 (where, λ is the wavelength of the laser light 1, and n is integer) has an opposite phase to the interference noise in a state where the laser light emitting element 31 is at the position of −λ·n/4. Accordingly, the interference noise can be reduced by averaging the signals that are detected by the light receiving unit 40 in such two states. Thus, the interference noise can be reduced, compared to a case of random fine movement.

By acquiring one measurement value and averaging four times in one single measurement period (offset), the intensity of the interference light can be expected to get reduced. By controlling the moving position of the optical element with the triangular wave, whose change in the displacement is linear, the interference noise can be removed efficiently.

Figure 11:
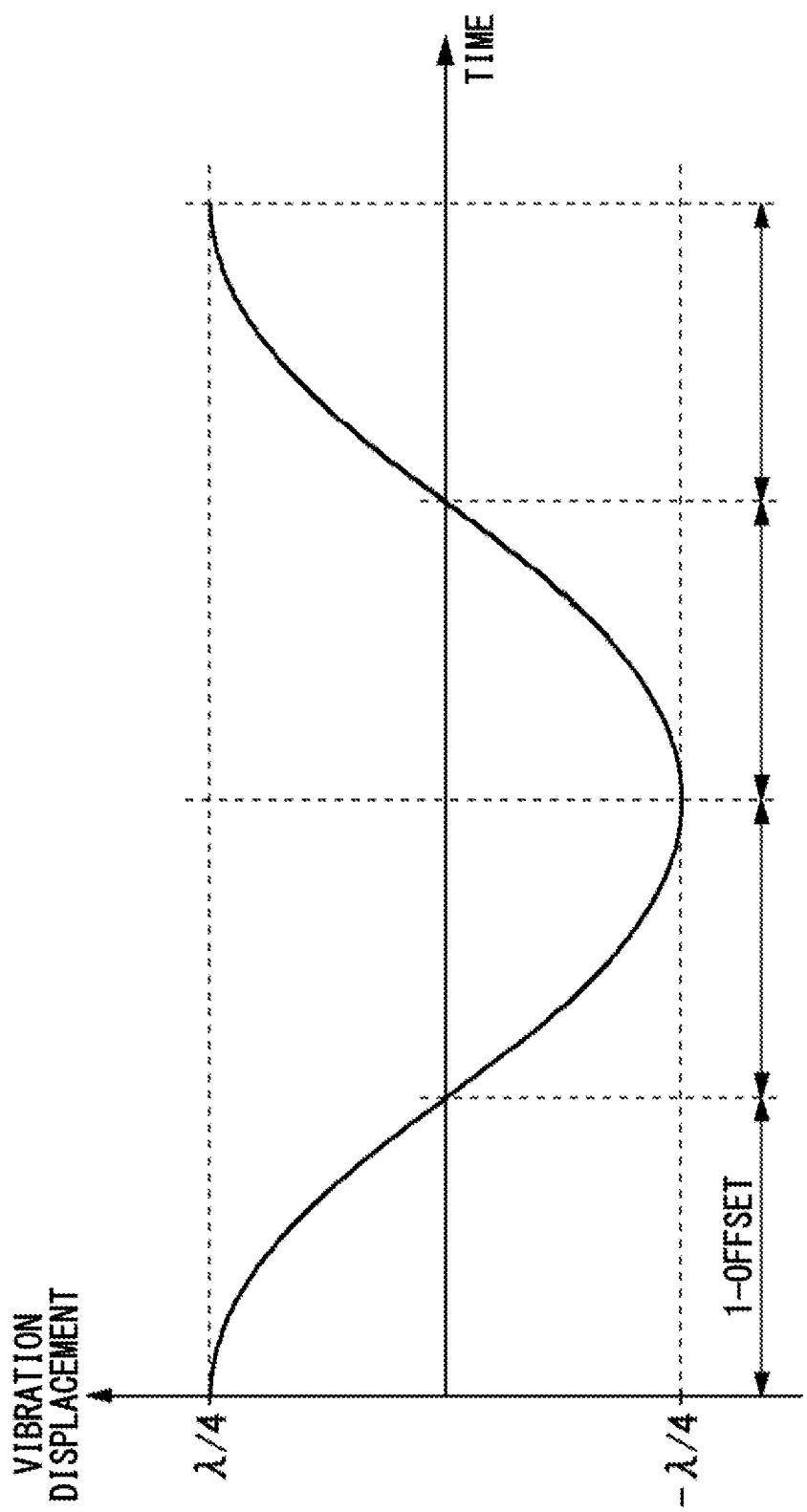
FIG. 11 shows another exemplary vibration waveform by the actuating unit.

FIG. 11 shows another exemplary vibration waveform by the actuating unit. In FIG. 11, the horizontal axis represents time, and the vertical axis represents the vibration displacement. As shown in FIG. 11, the actuating unit may control a vibration waveform indicating which position the optical element is moved to, with a sine wave. In the present example, concentration of the measuring object gas can be calculated, based on the signals detected by the light receiving unit 40 in the two states where the position of the laser light emitting element 31 is different by n/2 times the wavelength of the laser light 1 (where, n is integer). Accordingly, the interference noise can be reduced.

Figure 12:
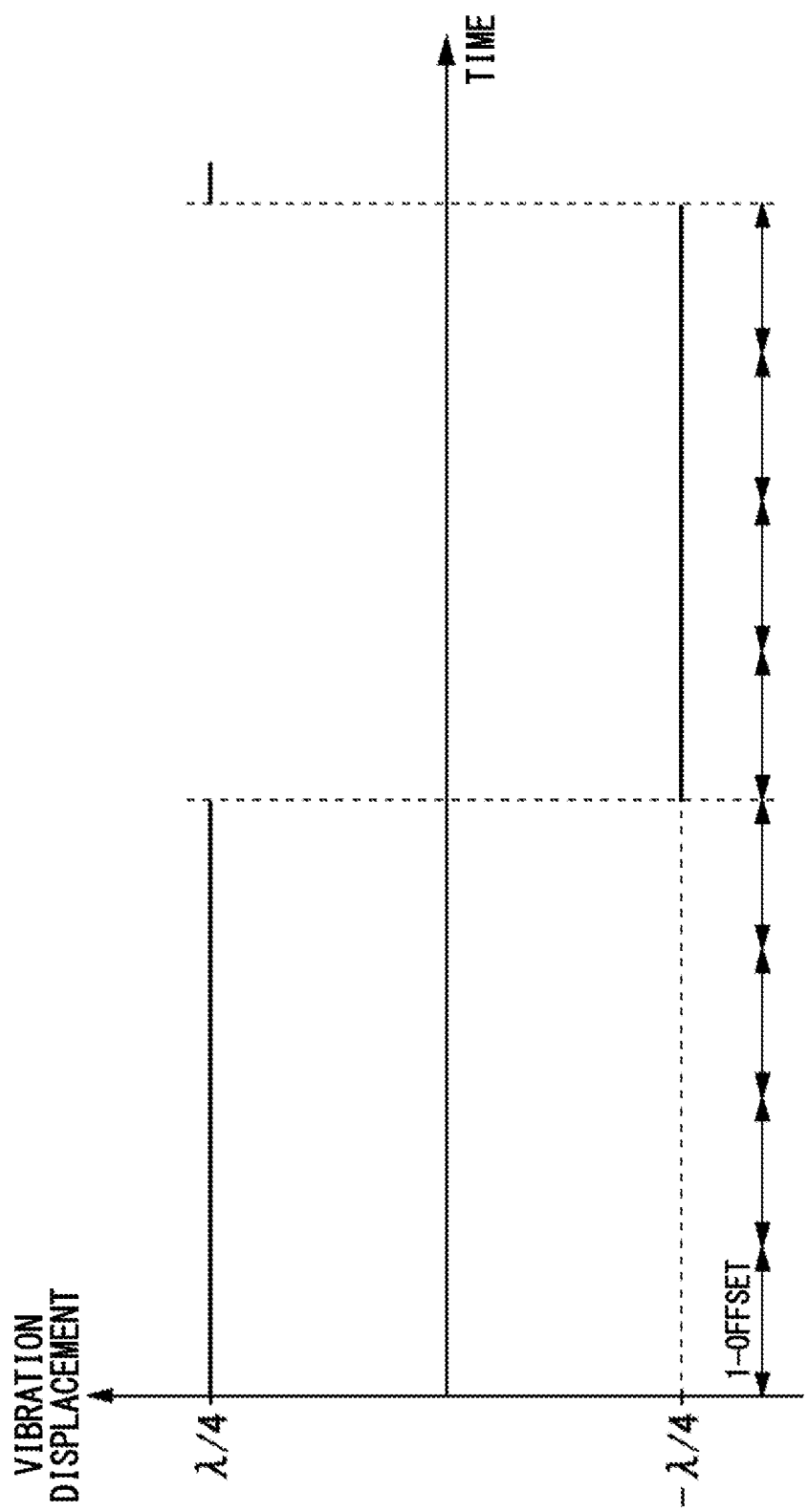
FIG. 12 shows another exemplary vibration waveform by the actuating unit.

FIG. 12 shows another exemplary vibration waveform in the actuating unit. In FIG. 12, the horizontal axis represents time, and the vertical axis represents the vibration displacement. As shown in FIG. 12, the actuating unit may control a vibration waveform indicating which position the optical element is moved to, with a rectangular wave. For example, if the concentration of the measuring object gas is calculated as its averaged value over T second(s) (e.g. 1 second), during the former half of the time period T/2, the actuating unit 36 moves the position of the laser light emitting element 31 to a position of +λ/4. During the latter half of the time period T/2, the actuating unit 36 moves the laser light emitting element 31 to the position of −λ/4. In the present example, the period of the rectangular wave is integer multiple of the measurement period (offset). In the example shown in FIG. 12, the period of the rectangular wave is eight times the measurement period (offset).

An interference noise in a state where the laser light emitting element 31 is at the position of +λ·n/4 (where, X is the wavelength of the laser light 1, and n is integer) has an opposite phase to the interference noise in a state where the laser light emitting element 31 is at the position of −λ·n/4. Accordingly, the interference noise can be reduced by averaging the signals that are detected by the light receiving unit 40 in such two states. As compared with the measurement frequency, the actuating unit 36 can make the frequency of the vibration of the piezo vibration unit 38 lower. Accordingly, the piezo vibration unit 38 as the actuator is not necessary to be operated at high speed, the piezo vibration unit 38 is easy to be stably operated.

FIGS. 10, 11, and 12 have described a case where the actuating unit 36 moves the laser light emitting element 31 such that the position of the laser light emitting element 31 is ±λ/4 and the amplitude thereof is λ/2. However, the gas analyzing apparatus 100 in the present embodiment is not limited to this. The actuating unit 36 may move the laser light emitting element 31 to the position of ±2λ/4(±λ/2), and the laser light emitting element 31 to the position of ±3λ/4, respectively.

Figure 13:
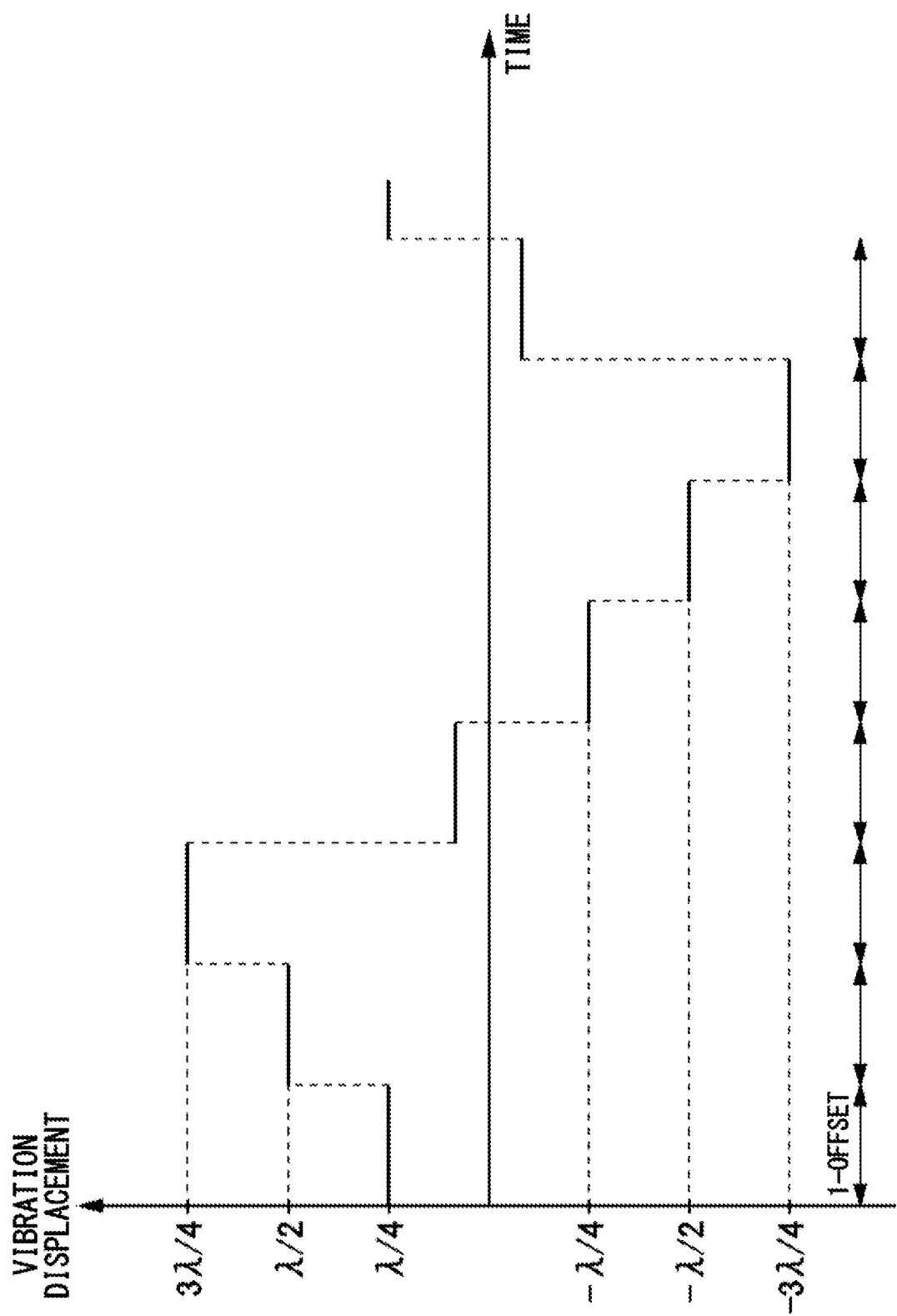
FIG. 13 shows another exemplary vibration waveform by the actuating unit.

FIG. 13 shows another exemplary vibration waveform in the actuating unit. In FIG. 13, the horizontal axis represents time, and the vertical axis represents the vibration displacement. As shown in FIG. 13, in the present example, the vibration displacement of the laser light emitting element 31 changes according to time. In the first single offset, in a state where the actuating unit 36 moves the laser light emitting element 31 to the position of +λ/4, the light receiving signal processing unit 60 obtains the measurement value of the gas concentration. In the next single offset, in a state where it moves the laser light emitting element 31 to the position of +2λ/4(+λ/2), the light receiving signal processing unit 60 obtains the measurement value of the gas concentration. Next, in the still next single offset, in a state where it moves the laser light emitting element 31 to the position of +3λ/4, the light receiving signal processing unit 60 obtains the measurement value of the gas concentration.

Similarly, the actuating unit 36 moves the laser light emitting element 31 to the positions of −λ/4, −2λ/4(−λ/2), −3λ/4. In each state, the light receiving signal processing unit 60 obtains the measurement value of the gas concentration. As shown in FIG. 13, there may be a time section to move the laser light emitting element 31 to the position of the wavelength λ/4n (n is integer), not to the position of integer multiple of the wavelength λ/4. In this manner, if the concentration of the measuring object gas is calculated by the averaged value over time period T to be output, the move amplitude of the optical element by the actuating unit 36, during time period T, may be changed sequentially.

As a vibration waveform indicating a position to which the laser light emitting element 31 is moved, combining a plurality of waveforms having different amplitudes that satisfy the relationship λ·n/2 (n is integer) enables noise reduction, regardless of optical systems existing between the laser light emitting element 31 and the light receiving element 41.

If the optical element gets vibrated with an amplitude of integer multiple of the minimum amplitude (λ/2) that can remove the interference, an interference removal effect works. However, due to difference in airframes of the optical systems of the light emitting unit 30 and the light receiving unit 40, their appropriate amplitudes are different. Accordingly, moving the optical element by the plurality of amplitudes (λ/2, 2λ/2, 3λ/2) from the beginning to be averaged enable to remove the interference noise effectively. Note that, in FIGS. 10 to 13, a case where the actuating unit 36 moves the laser light emitting element 31 has been described, but it is similar for a case where the actuating unit 47 moves the light receiving element 41. Accordingly, the description will not be repeated.

Figure 14:
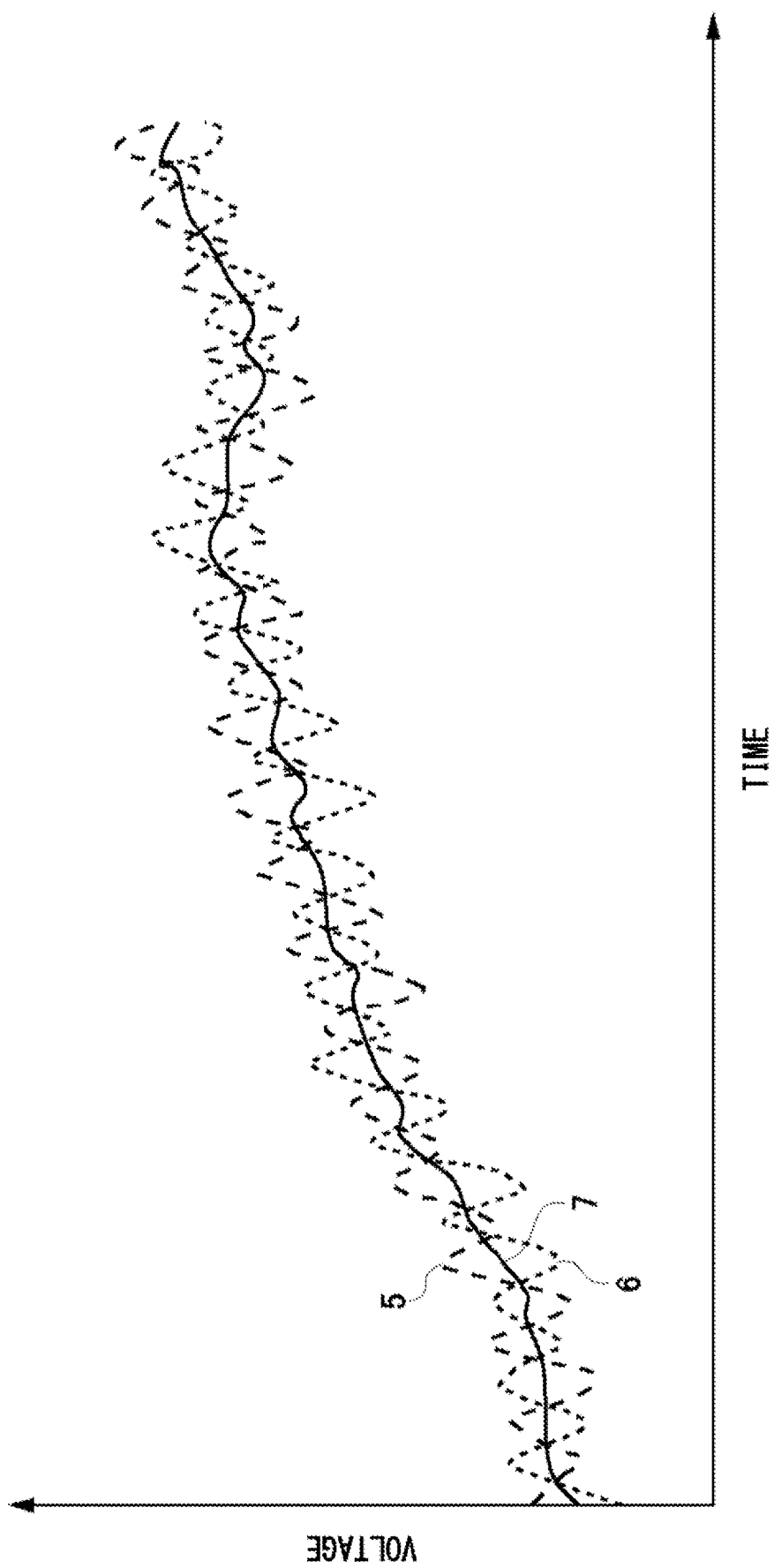
FIG. 14 shows examples of a measurement waveform and an averaged waveform, when a light receiving element 41 is moved to the position of ±λ/4 in the present embodiment.

FIG. 14 shows examples of a measurement waveform and an averaged waveform, when a light receiving element 41 is moved to the position of ±λ/4 in the present embodiment. A measurement waveform 5 at the time when the light receiving element 41 is moved to the position of +λ/4 has an opposite phase to a measurement waveform 6 at the time when the light receiving element 41 is moved to the position of −λ/4. Accordingly, in this manner, the interference noise is reduced as shown in an averaged waveform 7 that is obtained by averaging the signals detected by the light receiving unit 40 in the two states where the light receiving element 41 is at different positions by n/2 times the wavelength of the laser light 1 (where, n is integer).

Figure 15:
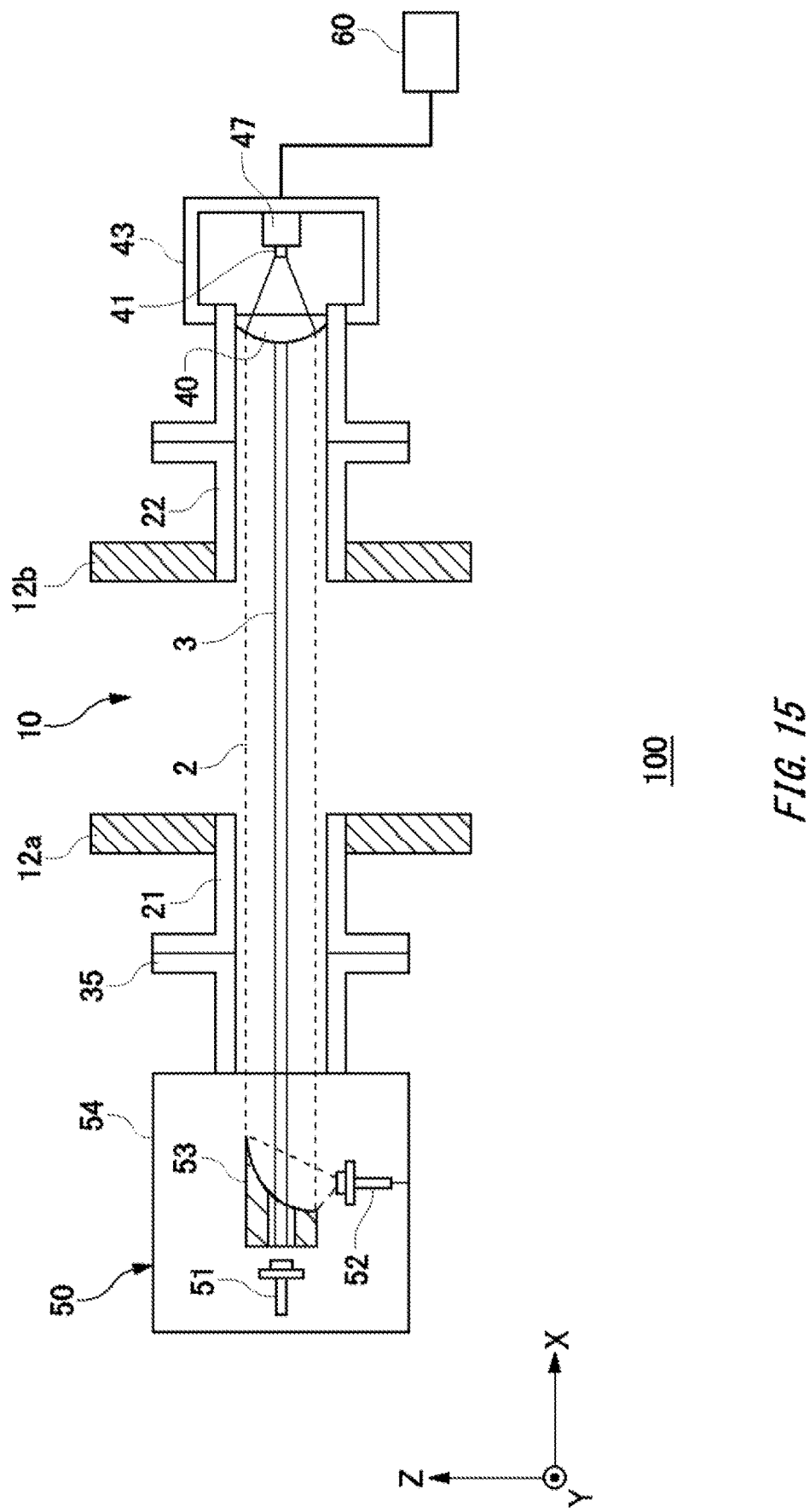
FIG. 15 is a cross sectional view illustrating a schematic configuration of a gas analyzing apparatus 100 in the second embodiment of the present invention.

FIG. 15 is a cross sectional view illustrating a schematic configuration of a gas analyzing apparatus 100 in the second embodiment of the present invention. The present embodiment has a different light emitting unit 50, as compared with the gas analyzing apparatus 100 of the first embodiment shown in FIG. 1. Except for the light emitting unit 50, the gas analyzing apparatus 100 in the present embodiment has the common structure to the first embodiment. Accordingly, the description will not be repeated. In the gas analyzing apparatus 100 in the present embodiment, the light emitting unit 50 includes, as the laser light emitting element, the first light emitting element 51 and the second light emitting element 52. The first light emitting element 51 and the second light emitting element 52 are provided in the housing 54. The first light emitting element 51 and the second light emitting element 52 are a plurality of light emitting elements whose light emitting wavelengths are different from each other. The first light emitting element 51 emits first laser light 3. The second light emitting element 52 emits second laser light 2.

Depending on components of the measuring object gas, either one of the first light emitting element 51 and the second light emitting element 52 may be a near-infrared light emitting element having a light-emitting wavelength band of 0.7 to 2.5 μm, whereas the other one may be a mid-infrared light emitting element having a light-emitting wavelength band of 3 to 10 μm.

In the present example, a concave mirror 53 is provided to collimate the second laser light 2. At the center part of the concave mirror 53, an opening may be provided. From the first light emitting element 51 arranged on the rear surface side of the concave mirror 53, the first laser light 3 is emitted through the opening. Note that microlens to collimate the first laser light 3 output from the first light emitting element 51 may be provided on the rear surface side of the concave mirror 53. Here, as long as there are a plurality of light emitting elements whose light emitting wavelengths are different from each other, optical systems are not limited to the structure shown in FIG. 15. In the present example, the actuating unit for the light emitting unit is not provided. The actuating unit 47 for the light receiving unit is provided. The actuating unit 47 moves the light receiving element 41.

The light emitting unit 50 selects either the first light emitting element 51 or the second light emitting element 52 to emit light. The actuating unit 47 moves the light receiving element 41 with an amplitude corresponding to the light emitting wavelength of the light emitting element that is emitting light. For example, if the first light emitting element 51 is a near-infrared light emitting element to emit the first laser light having the first wavelength $\lambda_1$ within the light-emitting wavelength band range of 0.7 to 2.5 μm, the actuating unit 47 moves the light receiving element 41 with an amplitude of $\lambda_1 \cdot n/2$ (where, n=1), e.g. an amplitude of 0.35 to 1.25 μm. Similarly, if the second light emitting element 52 is a mid-infrared light emitting element to emit the second laser light having the second wavelength $\lambda_2$ within the light-emitting wavelength band range of 3 to 10 μm, the actuating unit 47 moves the light receiving element 41 with an amplitude of $\lambda_2 \cdot n/2$ (where, n=1), e.g. an amplitude of 1.5 to 5 μm. Accordingly, if the second light emitting element 52 emits light, the light receiving element 41 is moved by a larger amplitude, as compared with the case where the first light emitting element 51 emits light.

If the actuating unit is provided on the light emitting unit 50, a plurality of actuating units are required to move the first light emitting element 51 and the second light emitting element 52. Also, since the structure of the light emitting unit 50 is complex, the actuating unit is difficult to be provided. However, according to the present example, the actuating unit 47 can move the light receiving element 41 with an amplitude corresponding to the light emitting wavelength of the light emitting element that is emitting light, and thus can provide a laser type gas analyzer corresponding to a plurality types of gas without increasing the number of the actuating units (actuators).

If concentration of the measuring object gas is calculated as the averaged value of the concentration of the gas over time period T, the light emitting unit 50 may, during time period T, sequentially select the first light emitting element 51 and the second light emitting element 52 to emit light. Also in this case, the actuating unit 47 moves the light receiving element 41 with an amplitude corresponding to the light emitting wavelength of the light emitting element that is emitting light.

Figure 16:
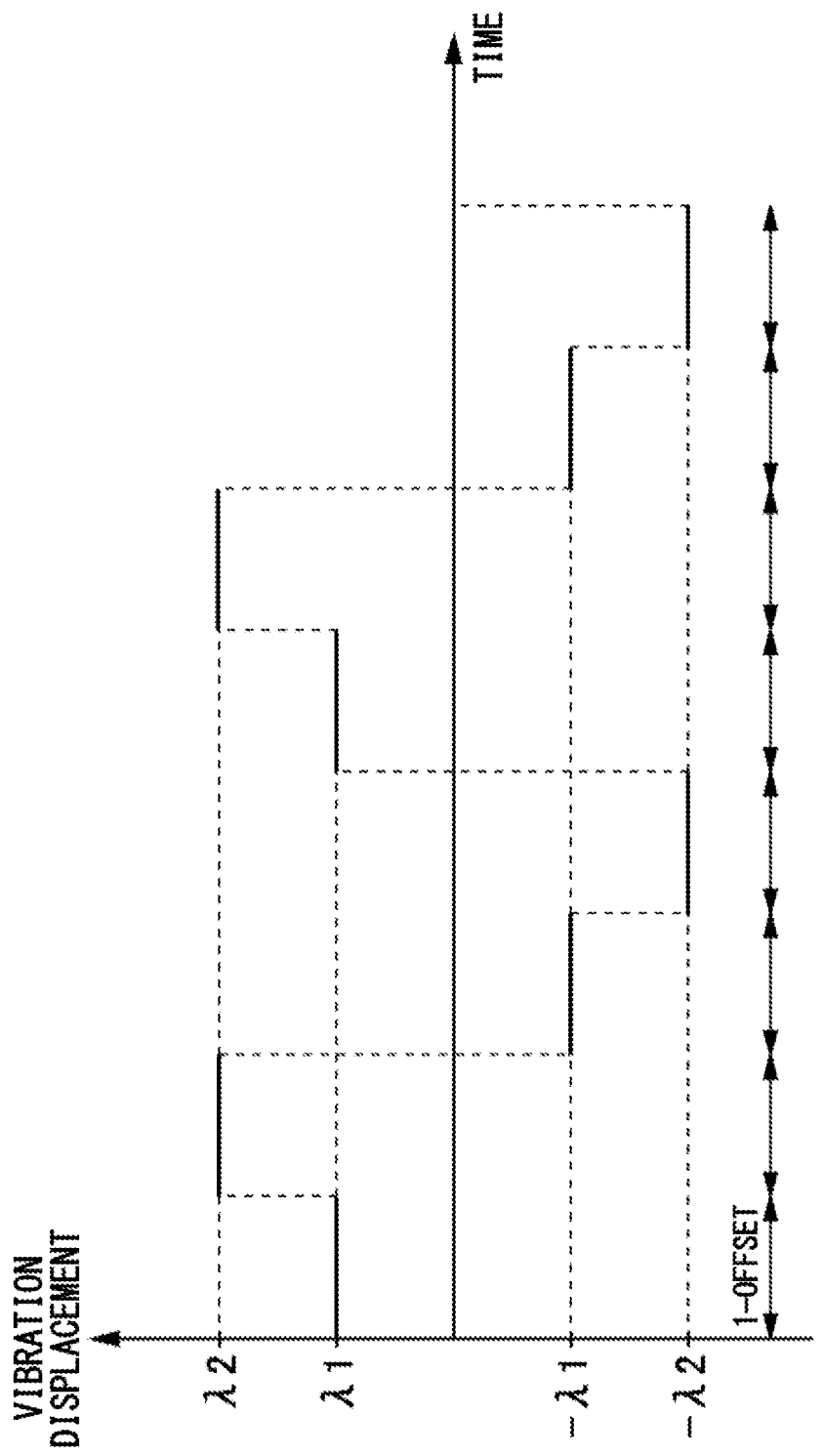
FIG. 16 shows an exemplary vibration waveform by an actuating unit.

FIG. 16 shows an exemplary vibration waveform by the actuating unit 47. In the present example, a case that $\pm \lambda \cdot n/4$ (n is integer), where n=4, is shown. In the present example, in the first measurement period (offset), the first light emitting element 51 emits light to emit the first laser light 3 having the first wavelength $\lambda_1$. Then, the position of the light receiving element 41 is moved to the position of $+\lambda_1 (+\lambda_1 \cdot n/4$, where n=4). Next, the first light emitting element 51 stops emitting light, and the second light emitting element 52 starts emitting light. Thereby, the second laser light 2 having the second wavelength $\lambda_2$ is emitted. Then, the position of the light receiving element 41 is moved to the position of $+\lambda_2 (+\lambda_2 \cdot n/4$, where n=4). Next, the second light emitting element 52 stops emitting light, and the first light emitting element 51 starts emitting light. Then, the position of the light receiving element 41 is moved to the position of $-\lambda_1$. Next, the first light emitting element 51 stops emitting light, and the second light emitting element 52 starts emitting light. Then, the position of the light receiving element 41 is moved to the position of $-\lambda_2$. The above processing is repeated.

As compared with a case of vibrating the light receiving element 41 as if moving to the positions of $+\lambda_1$, $-\lambda_1$, $+\lambda_2$, and $-\lambda_2$ in this order, moving amount of the piezo vibration unit 49 as the actuator can be reduced during each offset. Accordingly, if a plurality of light emitting elements having a plurality of wavelengths $\lambda_1$, $\lambda_2$ are selected sequentially, after the plurality of light emitting elements are moved sequentially to the positions corresponding to respective wavelengths $\lambda_1$, $\lambda_2$, that is, $+\lambda_1 n/4$, $+\lambda_2 \cdot n/4$ in the first direction from the reference position (+X-axis direction), they may be moved sequentially to the positions corresponding to respective wavelengths $\lambda_1$, $\lambda_2$, that is, $-\lambda_1 n/4$, $-\lambda_2 \cdot n/4$ in the second direction (−X-axis direction) that is opposite to the first direction.

Here, the order of moving the optical element such as the light receiving element 41 is not limited to this. The order of moving the optical element may be changed every time period T, which is an interval to output concentration of the measuring object gas.

Figure 17:
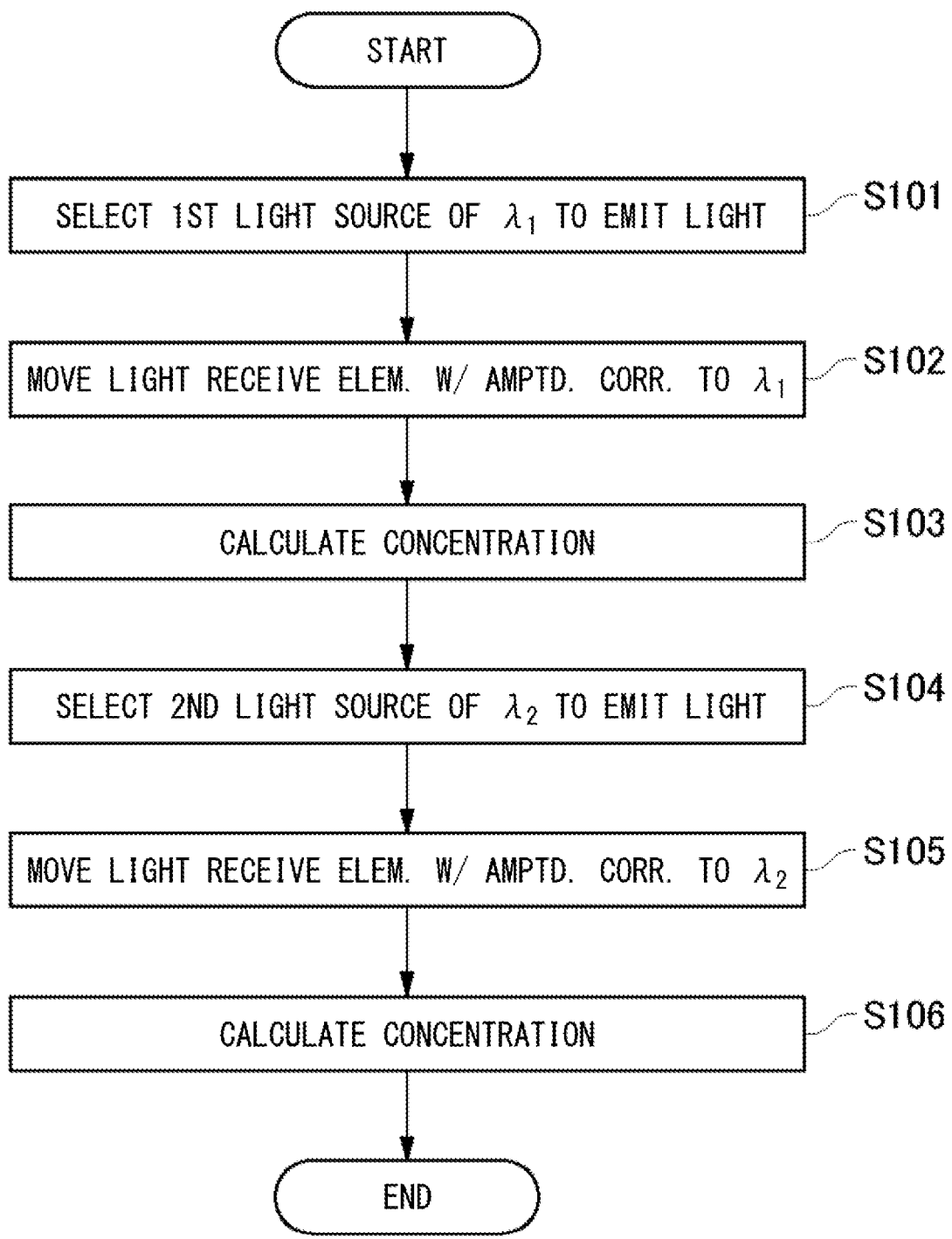
FIG. 17 is a flowchart illustrating processing contents of the gas analyzing apparatus 100 in the present embodiment.

FIG. 17 is a flowchart illustrating processing contents of the gas analyzing apparatus 100 in the present embodiment. The light emitting unit 50 selects the first light emitting element 51 to emit light (step S101). The actuating unit 47 moves the light receiving element 41 with an amplitude corresponding to the light emitting wavelength $\lambda_1$ of the first light emitting element 51 that is emitting light (step S102). Concentration of the measuring object gas is calculated, based on the signals detected by the light receiving unit 40 in the two states where the light receiving element 41 is at different positions by n/2 times the wavelength $\lambda_1$ of the first laser light 3 (where, n is integer) (step S103).

Next, the light emitting unit 50 selects the second light emitting element 52 to emit light (step S104). The actuating unit 47 moves the light receiving element 41 with an amplitude corresponding to the light emitting wavelength $\lambda_2$ of the second light emitting element 52 that is emitting light. Concentration of the measuring object gas is calculated, based on the signals detected by the light receiving unit 40 in the two states where the light receiving element 41 is at different positions by n/2 times the wavelength $\lambda_2$ of the second laser light 2 (where, n is integer) (step S106).

Note that, in the step S102, if the light receiving element 41 is vibrated, according to the wavelength $\lambda_1$, with an amplitude $n\lambda_1/2$ along the optical axis to be at two positions of $\pm n\lambda_1/4$, a signal detected by the light receiving unit 40 may be acquired. Similarly, in the step S105, if the light receiving element 41 is vibrated, according to the wavelength $\lambda_2$, with an amplitude $n\lambda_2/2$ along the optical axis to be at two positions of $\pm n\lambda_2/4$, a signal detected by the light receiving unit 40 may be acquired. On the other hand, as shown in FIG. 16, the actuating unit 47 may sequentially move the light receiving element 41 to the positions of: $+n\lambda_1/4$, $+n\lambda_2/4$, $-n\lambda_1/4$, and $-n\lambda_2/4$ in this order, and may acquire the signals detected by the light receiving unit 40 at respective positions of the light receiving element 41.

In the description above, a case where the actuating unit moves, as the optical element, at least one of the light receiving element 41 and the laser light emitting element 31 has been described. However, if the structure allows the condenser lens 42 etc. to be moved, the actuating unit may move other optical elements such as the condenser lens 42. Also in this case, concentration of the measuring object gas is calculated, based on the signals detected by the light receiving unit in the two states where the optical element is at different positions by n/2 times the wavelength of the laser light (where, n is integer). Thereby, as compared with a case of moving the condenser lens randomly, the interference noise can be reduced. Particularly, the light receiving unit 40 and the light receiving signal processing unit 60 may measure intensity of the laser light and perform signal processing, synchronizing the period where the actuating unit moves the optical element, and thus a gas analyzing apparatus removing the vibration efficiently can be provided.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: laser light; 2: second laser light; 3: first laser light; 5: measurement waveform; 6: measurement waveform; 7: averaged waveform; 10: flue; 11: measurement object space; 12: wall part; 14: opening; 21: light-emitting-side flange unit; 22: light-receiving-side flange unit; 30: light emitting unit; 31: laser light emitting element; 32: laser light source unit; 33: collimator lens; 34: housing; 35: emitting tube; 36: actuating unit; 37: base plate; 38: piezo vibration unit; 39: connecting part; 40: light receiving unit; 41: light receiving element; 42: condenser lens; 43: housing; 44: entering tube; 45: circuit board; 46: amplifier; 47: actuating unit; 48: base plate; 49: piezo vibration unit; 50: light emitting unit; 51: first light emitting element; 52: second light emitting element; 53: concave mirror; 54: housing; 60: light receiving signal processing unit; 61: I-V converter; 62: oscillator; 63: synchronization detecting circuit; 64: low pass filter; 65: operating unit; 72: heat radiation part; 100: gas analyzing apparatus; 202: wavelength control unit; 204: wavelength scan driving signal generating unit; 205: harmonic modulation signal generating unit; 206: current control unit; 207: temperature control unit; 208: thermistor; 210: Peltier device

What is claimed is:

1. A gas analyzing apparatus for analyzing component included in measuring object gas, comprising:
    a laser to irradiate laser light to the measuring object gas;
    a photo diode to receive the laser light having passed through the measuring object gas;
    an actuator connected to at least one optical element that is arranged in a light path where the laser light is passing, the actuator being adapted to move the at least one optical element along an optical axis to change an optical path length of the laser light; and
    a synchronization detecting circuit to calculate concentration of the measuring object gas, based on a correspondence between a first amount of the laser light detected by the photo diode in a first state where the optical element is at a first position, and a second amount of the laser light detected by the photo diode in a second state where the optical element is moved by the actuator to a second position different from the first position by n/2 times a wavelength of the laser light (where, n is integer), wherein
    the synchronization detecting circuit modulates a 2f (double-frequency) signal to an output of the photo diode, and extracts an amplitude of a double-frequency component of the modulated output of the photo diode.

2. The gas analyzing apparatus according to claim 1, wherein
    the actuator moves at least one of the laser and the photo diode.

3. The gas analyzing apparatus according to claim 2, wherein
    the laser has a plurality of light emitting elements each having a different light emitting wavelength, and
    the actuator moves the photo diode.

4. The gas analyzing apparatus according to claim 2, wherein
    the laser further has a heat radiation part to radiate heat of the laser; and
    the actuator moves the photo diode.

5. The gas analyzing apparatus according to claim 2, wherein
    the photo diode further has a circuit board including an amplifier to amplify a signal output from the photo diode, and
    the actuator is adapted to move the photo diode and the circuit board.

6. The gas analyzing apparatus according to claim 1, wherein
    the actuator moves the at least one optical element an amount corresponding to the n/2 times the wavelength of the laser light.

7. The gas analyzing apparatus according to claim 6, wherein
    the photo diode measures intensity of the laser light.

8. The gas analyzing apparatus according to claim 1, wherein
    the actuator is adapted to control positions to which the at least one optical element is moved, with a triangular wave.

9. The gas analyzing apparatus according to claim 1, wherein the actuator is adapted to control positions to which the at least one optical element is moved, with a rectangular wave.

10. A gas analyzing apparatus for analyzing component included in measuring object gas, comprising:
a laser to irradiate laser light to the measuring object gas;
a photo diode to receive the laser light having passed through the measuring object gas;
an actuator connected to at least one optical element that is arranged in a light path where the laser light is passing, the actuator being adapted to move the at least one optical element along an optical axis to change an optical path length of the laser light; and
a synchronization detecting circuit to calculate concentration of the measuring object gas, based on a correspondence between a first amount of the laser light detected by the photo diode in a first state where the optical element is at a first position, and a second amount of the laser light detected by the photo diode in a second state where the optical element is moved by the actuator to a second position different from the first position by n/2 times a wavelength of the laser light (where, n is integer), wherein
the actuator moves at least one of the laser and the photo diode,
the laser has a plurality of light emitting elements each having a different light emitting wavelength,
the actuator moves the photo diode,
the laser selects any of the plurality of light emitting elements to emit the laser light, and
the actuator moves the photo diode an amount corresponding to a wavelength of the laser light.

11. A gas analyzing apparatus component included in measuring object gas, comprising:
a laser to irradiate laser light to the measuring object gas;
a photo diode to receive the laser light having passed through the measuring object gas;
an actuator connected to at least one optical element that is arranged in a light path where the laser light is passing, the actuator being adapted to move the at least one optical element along an optical axis to change an optical path length of the laser light; and
a synchronization detecting circuit to calculate concentration of the measuring object gas, based on a correspondence between a first amount of the laser light detected by the photo diode in a first state where the optical element is at a first position, and a second amount of the laser light detected by the photo diode in a second state where the optical element is moved by the actuator to a second position different from the first position by n/2 times a wavelength of the laser light (where, n is integer), wherein
the actuator moves at least one of the laser and the photo diode,
the laser has a plurality of light emitting elements each having a different light emitting wavelength,
the actuator moves the photo diode,
the laser sequentially selects each of the plurality of light emitting elements to emit the laser light, and
the actuator sequentially moves the photo diode to positions corresponding to the wavelength of the laser light.

12. A gas analyzing apparatus component included in measuring object gas, comprising:
a laser to irradiate laser light to the measuring object gas;
a photo diode to receive the laser light having passed through the measuring object gas;
an actuator connected to at least one optical element that is arranged in a light path where the laser light is passing, the actuator being adapted to move the at least one optical element along an optical axis to change an optical path length of the laser light; and
a synchronization detecting circuit to calculate concentration of the measuring object gas, based on a correspondence between a first amount of the laser light detected by the photo diode in a first state where the optical element is at a first position, and a second amount of the laser light detected by the photo diode in a second state where the optical element is moved by the actuator to a second position different from the first position by n/2 times a wavelength of the laser light (where, n is integer), wherein
the actuator moves at least one of the laser and the photo diode, and
the laser has:
a heat radiation part to radiate heat of the laser; and
a connecting part to thermally connect between the laser and the heat radiation part, without fixing a relative position between the laser and the heat radiation part, and wherein
the actuator is adapted to move the laser.

* * * * *